United States Patent
Allen et al.

(10) Patent No.: US 10,921,001 B2
(45) Date of Patent: Feb. 16, 2021

(54) METHODS AND APPARATUS FOR UNIFORM DISTRIBUTION OF LIQUID DESICCANT IN MEMBRANE MODULES IN LIQUID DESICCANT AIR-CONDITIONING SYSTEMS

(71) Applicant: 7AC Technologies, Inc., Beverly, MA (US)

(72) Inventors: Carl Allen, Beverly, MA (US); Mark A. Allen, Essex, MA (US); Scott N. Rowe, Dover, NH (US); Mark D. Rosenblum, Woburn, MA (US); Peter Luttik, Beverly, MA (US)

(73) Assignee: 7AC Technologies, Inc., Beverly, MA (US)

( * ) Notice: Subject to any disclaimer, the term of this patent is extended or adjusted under 35 U.S.C. 154(b) by 0 days.

(21) Appl. No.: 16/177,768

(22) Filed: Nov. 1, 2018

(65) Prior Publication Data

US 2019/0145639 A1    May 16, 2019

Related U.S. Application Data

(60) Provisional application No. 62/580,222, filed on Nov. 1, 2017.

(51) Int. Cl.
*F24F 3/14* (2006.01)
*B01D 53/18* (2006.01)
*F28D 21/00* (2006.01)
*F28D 3/04* (2006.01)
*F28F 21/06* (2006.01)

(52) U.S. Cl.
CPC ............ *F24F 3/1417* (2013.01); *B01D 53/18* (2013.01); *F28D 21/00* (2013.01); *F24F 2003/1458* (2013.01); *F28D 2021/0038* (2013.01)

(58) Field of Classification Search
CPC .... F24F 3/1417; F28D 21/0018; B01D 53/18; B01D 53/263
See application file for complete search history.

(56) References Cited

U.S. PATENT DOCUMENTS

| | | |
|---|---|---|
| 1,791,086 A | 2/1931 | Sperr |
| 2,221,787 A | 11/1940 | Downs et al. |

(Continued)

FOREIGN PATENT DOCUMENTS

| | | |
|---|---|---|
| CN | 100366981 C | 2/2008 |
| CN | 101336358 A | 12/2008 |

(Continued)

OTHER PUBLICATIONS

Open Absorption System for Cooling and Air Conditioning using Membrane Contactors—Annual Report 2005, Publication Number: Publication 260097, Project: 101310—Open Absorption System for Cooling and Air Conditioning using Membrane Contactors, Date of publication: Jan. 31, 2006, Author: Manuel Conde-Petit, Robert Weber, Contractor: M. Conde Engineering.

(Continued)

*Primary Examiner* — Christopher R Zerphey
(74) *Attorney, Agent, or Firm* — Foley Hoag LLP; Rajesh Vallabh

(57) ABSTRACT

A liquid desiccant air-conditioning system provides a uniform liquid desiccant flow distribution and wetting out of membranes used in the membrane-modules of the system.

21 Claims, 21 Drawing Sheets

(56) References Cited

U.S. PATENT DOCUMENTS

| | | | |
|---|---|---|---|
| 2,235,322 A | 3/1941 | Martin | |
| 2,433,741 A | 12/1947 | Crawford | |
| 2,634,958 A | 4/1953 | Simpelaar | |
| 2,660,159 A | 11/1953 | Hughes | |
| 2,708,915 A | 5/1955 | Mandelburg | |
| 2,939,686 A | 6/1960 | Wildermuth | |
| 2,988,171 A | 6/1961 | Arnold et al. | |
| 3,119,446 A | 1/1964 | Weiss | |
| 3,193,001 A | 7/1965 | Meckler | |
| 3,276,634 A | 10/1966 | Arnot | |
| 3,409,969 A | 11/1968 | Simons | |
| 3,410,581 A | 11/1968 | Christensen | |
| 3,455,338 A | 7/1969 | Pollit | |
| 3,718,181 A | 2/1973 | Reilly et al. | |
| 4,100,331 A | 7/1978 | Fletcher et al. | |
| 4,164,125 A | 8/1979 | Griffiths | |
| 4,176,523 A | 12/1979 | Rousseau | |
| 4,205,529 A | 6/1980 | Ko | |
| 4,209,368 A | 6/1980 | Coker et al. | |
| 4,222,244 A | 9/1980 | Meckler | |
| 4,235,221 A | 11/1980 | Murphy | |
| 4,239,507 A | 12/1980 | Benoit et al. | |
| 4,259,849 A | 4/1981 | Griffiths | |
| 4,305,456 A * | 12/1981 | Mueller | F24D 17/02 165/145 |
| 4,324,947 A | 4/1982 | Dumbeck | |
| 4,341,263 A * | 7/1982 | Arbabian | F24D 11/005 165/296 |
| 4,399,862 A | 8/1983 | Hile | |
| 4,429,545 A | 2/1984 | Steinberg | |
| 4,435,339 A | 3/1984 | Kragh | |
| 4,444,992 A | 4/1984 | Cox, III | |
| 4,583,996 A | 4/1986 | Sakata et al. | |
| 4,607,132 A | 8/1986 | Jarnagin | |
| 4,612,019 A | 9/1986 | Langhorst | |
| 4,649,899 A | 3/1987 | Moore | |
| 4,660,390 A | 4/1987 | Worthington | |
| 4,686,938 A * | 8/1987 | Rhodes | B01D 53/263 122/1 R |
| 4,691,530 A | 9/1987 | Meckler | |
| 4,703,629 A | 11/1987 | Moore | |
| 4,730,600 A | 3/1988 | Harrigill | |
| 4,744,414 A | 5/1988 | Schon | |
| 4,766,952 A | 8/1988 | Onodera | |
| 4,786,301 A | 11/1988 | Rhodes | |
| 4,832,115 A | 5/1989 | Albers et al. | |
| 4,872,578 A | 10/1989 | Fuerschbach et al. | |
| 4,882,907 A | 11/1989 | Brown, II | |
| 4,887,438 A | 12/1989 | Meckler | |
| 4,900,448 A | 2/1990 | Bonne et al. | |
| 4,910,971 A | 3/1990 | McNab | |
| 4,939,906 A | 7/1990 | Spatz et al. | |
| 4,941,324 A | 7/1990 | Peterson et al. | |
| 4,955,205 A | 9/1990 | Wilkinson | |
| 4,971,142 A | 11/1990 | Mergler | |
| 4,976,313 A | 12/1990 | Dahlgren et al. | |
| 4,979,965 A | 12/1990 | Sannholm | |
| 4,984,434 A | 1/1991 | Peterson et al. | |
| 4,987,750 A | 1/1991 | Meckler | |
| 5,005,371 A | 4/1991 | Yonezawa et al. | |
| 5,181,387 A | 1/1993 | Meckler | |
| 5,182,921 A | 2/1993 | Yan | |
| 5,186,903 A | 2/1993 | Cornwell | |
| 5,191,771 A | 3/1993 | Meckler | |
| 5,221,520 A | 6/1993 | Cornwell | |
| 5,351,497 A | 10/1994 | Lowenstein | |
| 5,361,828 A | 11/1994 | Lee et al. | |
| 5,375,429 A | 12/1994 | Tokizaki et al. | |
| 5,448,895 A | 9/1995 | Coellner et al. | |
| 5,462,113 A | 10/1995 | Wand | |
| 5,471,852 A * | 12/1995 | Meckler | B01D 53/261 62/271 |
| 5,528,905 A | 6/1996 | Scarlatti | |
| 5,534,186 A | 7/1996 | Walker et al. | |
| 5,582,026 A | 12/1996 | Barto, Sr. | |
| 5,595,690 A | 1/1997 | Filburn et al. | |
| 5,605,628 A | 2/1997 | Davidson et al. | |
| 5,606,865 A | 3/1997 | Caron | |
| 5,638,900 A | 6/1997 | Lowenstein et al. | |
| 5,641,337 A | 6/1997 | Arrowsmith et al. | |
| 5,661,983 A | 9/1997 | Groten et al. | |
| 5,685,152 A | 11/1997 | Sterling | |
| 5,685,485 A | 11/1997 | Mock et al. | |
| 5,797,272 A | 8/1998 | James | |
| 5,816,065 A | 10/1998 | Maeda | |
| 5,832,993 A | 11/1998 | Ohata et al. | |
| 5,860,284 A | 1/1999 | Goland et al. | |
| 5,860,285 A | 1/1999 | Tulpule | |
| 5,928,808 A | 7/1999 | Eshraghi | |
| 5,933,702 A | 8/1999 | Goswami | |
| 5,950,442 A | 9/1999 | Maeda et al. | |
| 6,012,296 A | 1/2000 | Shah | |
| 6,018,954 A * | 2/2000 | Assaf | F24F 3/1411 62/271 |
| 6,035,657 A | 3/2000 | Dobak, III et al. | |
| 6,083,387 A | 7/2000 | LeBlanc et al. | |
| 6,103,969 A | 8/2000 | Bussey | |
| 6,131,649 A | 10/2000 | Pearl et al. | |
| 6,134,903 A | 10/2000 | Potnis et al. | |
| 6,138,470 A | 10/2000 | Potnis et al. | |
| 6,156,102 A | 12/2000 | Conrad et al. | |
| 6,171,374 B1 | 1/2001 | Barton et al. | |
| 6,216,483 B1 | 4/2001 | Potnis et al. | |
| 6,216,489 B1 | 4/2001 | Potnis et al. | |
| 6,244,062 B1 | 6/2001 | Prado | |
| 6,247,604 B1 | 6/2001 | Taskis et al. | |
| 6,266,975 B1 | 7/2001 | Assaf | |
| 6,417,423 B1 | 7/2002 | Koper et al. | |
| 6,442,951 B1 | 9/2002 | Maeda et al. | |
| 6,463,750 B2 | 10/2002 | Assaf | |
| 6,487,872 B1 | 12/2002 | Forkosh et al. | |
| 6,488,900 B1 | 12/2002 | Call et al. | |
| 6,497,107 B2 | 12/2002 | Maisotsenko et al. | |
| 6,497,749 B2 | 12/2002 | Kesten et al. | |
| 6,502,807 B1 | 1/2003 | Assaf et al. | |
| 6,514,321 B1 | 2/2003 | Lehto et al. | |
| 6,539,731 B2 | 4/2003 | Kesten et al. | |
| 6,546,746 B2 | 4/2003 | Forkosh et al. | |
| 6,557,365 B2 | 5/2003 | Dinnage et al. | |
| 6,660,069 B2 | 12/2003 | Sato et al. | |
| 6,684,649 B1 | 2/2004 | Thompson | |
| 6,739,142 B2 | 5/2004 | Korin | |
| 6,745,826 B2 | 6/2004 | Lowenstein et al. | |
| 6,766,817 B2 | 7/2004 | da Silva et al. | |
| 6,848,265 B2 | 2/2005 | Lowenstein et al. | |
| 6,854,278 B2 | 2/2005 | Maisotsenko et al. | |
| 6,854,279 B1 | 2/2005 | Digiovanni et al. | |
| 6,918,404 B2 | 7/2005 | Dias da Silva et al. | |
| 6,938,434 B1 | 9/2005 | Fair | |
| 6,945,065 B2 | 9/2005 | Lee et al. | |
| 6,976,365 B2 | 12/2005 | Forkosh et al. | |
| 6,986,428 B2 | 1/2006 | Hester et al. | |
| 7,066,586 B2 | 6/2006 | da Silva et al. | |
| RE39,288 E | 9/2006 | Assaf | |
| 7,143,597 B2 | 12/2006 | Hyland et al. | |
| 7,191,821 B2 | 3/2007 | Gronwall et al. | |
| 7,197,887 B2 | 4/2007 | Maisotsenko et al. | |
| 7,228,891 B2 | 6/2007 | Shin et al. | |
| 7,258,923 B2 | 8/2007 | van den Bogerd et al. | |
| 7,269,966 B2 | 9/2007 | Lowenstein et al. | |
| 7,279,215 B2 | 10/2007 | Hester et al. | |
| 7,306,650 B2 | 12/2007 | Slayzak et al. | |
| 7,337,615 B2 | 3/2008 | Reidy | |
| 7,430,878 B2 | 10/2008 | Assaf | |
| 7,758,671 B2 | 7/2010 | Kesten et al. | |
| 7,841,201 B2 * | 11/2010 | Sedlak | F04D 29/30 62/268 |
| 7,930,896 B2 | 4/2011 | Matsui et al. | |
| 7,938,888 B2 | 5/2011 | Assaf | |
| 8,141,379 B2 | 3/2012 | Al-Hadhrami et al. | |
| 8,337,590 B2 | 12/2012 | Herencia et al. | |
| 8,353,175 B2 | 1/2013 | Wohlert | |
| 8,496,732 B2 | 7/2013 | Culp et al. | |
| 8,499,576 B2 | 8/2013 | Meijer | |

(56) References Cited

U.S. PATENT DOCUMENTS

| | | |
|---|---|---|
| 8,500,960 B2 | 8/2013 | Ehrenberg et al. |
| 8,623,210 B2 | 1/2014 | Manabe et al. |
| 8,641,806 B2 | 2/2014 | Claridge et al. |
| 8,648,209 B1 | 2/2014 | Lastella |
| 8,695,363 B2 | 4/2014 | Tang et al. |
| 8,696,805 B2 | 4/2014 | Chang et al. |
| 8,769,971 B2 | 7/2014 | Kozubal et al. |
| 8,790,454 B2 | 7/2014 | Lee et al. |
| 8,800,308 B2 | 8/2014 | Vandermeulen et al. |
| 8,876,943 B2 | 11/2014 | Gottlieb et al. |
| 8,881,806 B2 | 11/2014 | Xie et al. |
| 8,943,844 B2 | 2/2015 | Forkosh |
| 8,943,850 B2 | 2/2015 | Vandermeulen et al. |
| 8,968,945 B2 | 3/2015 | Fasold et al. |
| 9,000,289 B2 | 4/2015 | Vandermeulen et al. |
| 9,086,223 B2 | 7/2015 | Vandermeulen et al. |
| 9,101,874 B2 * | 8/2015 | Vandermeulen ........ F24F 3/1417 |
| 9,101,875 B2 | 8/2015 | Vandermeulen et al. |
| 9,243,810 B2 | 1/2016 | Vandermeulen et al. |
| 9,273,877 B2 * | 3/2016 | Vandermeulen ........ H02S 40/44 |
| 9,308,490 B2 | 4/2016 | Vandermeulen et al. |
| 9,377,207 B2 | 6/2016 | Vandermeulen et al. |
| 9,429,332 B2 | 8/2016 | Vandermeulen et al. |
| 9,470,426 B2 | 10/2016 | Vandermeulen |
| 9,506,697 B2 | 11/2016 | Vandermeulen |
| 9,631,823 B2 | 4/2017 | Vandermeulen et al. |
| 9,631,824 B1 | 4/2017 | Maisey et al. |
| 9,631,848 B2 | 4/2017 | Vandermeulen et al. |
| 9,709,285 B2 | 7/2017 | Vandermeulen |
| 9,709,286 B2 | 7/2017 | Vandermeulen |
| 9,835,340 B2 | 12/2017 | Vandermeulen et al. |
| 10,006,648 B2 | 6/2018 | Vandermeulen et al. |
| 10,024,558 B2 | 7/2018 | Vandermeulen |
| 10,024,601 B2 | 7/2018 | Vandermeulen |
| 10,168,056 B2 | 1/2019 | Vandermeulen |
| 10,323,867 B2 | 6/2019 | Vandermeulen |
| 10,443,868 B2 | 10/2019 | Vandermeulen et al. |
| 10,591,191 B2 * | 3/2020 | Christians .............. F25B 41/00 |
| 10,619,867 B2 | 4/2020 | Vandermeulen |
| 10,619,868 B2 | 4/2020 | Vandermeulen |
| 10,619,895 B1 | 4/2020 | Vandermeulen |
| 10,731,876 B2 | 8/2020 | Vandermeulen |
| 10,753,624 B2 | 8/2020 | Vandermeulen et al. |
| 10,760,830 B2 | 9/2020 | Vandermeulen et al. |
| 2001/0008148 A1 | 7/2001 | Ito et al. |
| 2001/0013226 A1 | 8/2001 | Potnis et al. |
| 2001/0015500 A1 | 8/2001 | Shimanuki et al. |
| 2002/0023740 A1 | 2/2002 | Lowenstein et al. |
| 2002/0026797 A1 | 3/2002 | Sundhar |
| 2002/0038552 A1 | 4/2002 | Maisotsenko et al. |
| 2002/0098395 A1 | 7/2002 | Shimanuki et al. |
| 2002/0104439 A1 | 8/2002 | Komkova et al. |
| 2002/0139245 A1 | 10/2002 | Kesten et al. |
| 2002/0139320 A1 | 10/2002 | Shimanuki et al. |
| 2002/0148602 A1 | 10/2002 | Nakamura |
| 2002/0185266 A1 | 12/2002 | Dobbs et al. |
| 2003/0000230 A1 | 1/2003 | Kopko |
| 2003/0029185 A1 | 2/2003 | Kopko |
| 2003/0033821 A1 | 2/2003 | Maisotsenko et al. |
| 2003/0051367 A1 | 3/2003 | Griffin |
| 2003/0051498 A1 | 3/2003 | Sanford |
| 2003/0106680 A1 | 6/2003 | Serpico et al. |
| 2003/0121271 A1 | 7/2003 | Dinnage et al. |
| 2003/0230092 A1 | 12/2003 | Lowenstein et al. |
| 2004/0040697 A1 | 3/2004 | Pierre et al. |
| 2004/0061245 A1 | 4/2004 | Maisotsenko et al. |
| 2004/0101698 A1 | 5/2004 | Yamanaka et al. |
| 2004/0109798 A1 | 6/2004 | Chopard et al. |
| 2004/0112077 A1 | 6/2004 | Forkosh et al. |
| 2004/0118125 A1 | 6/2004 | Potnis et al. |
| 2004/0134212 A1 | 7/2004 | Lee et al. |
| 2004/0168462 A1 | 9/2004 | Assaf |
| 2004/0194944 A1 | 10/2004 | Hendricks et al. |
| 2004/0211207 A1 | 10/2004 | Forkosh et al. |
| 2004/0230092 A1 | 11/2004 | Thierfelder et al. |
| 2004/0231512 A1 | 11/2004 | Slayzak et al. |
| 2004/0261440 A1 | 12/2004 | Forkosh et al. |
| 2005/0095433 A1 | 5/2005 | Bogerd et al. |
| 2005/0106021 A1 | 5/2005 | Bunker et al. |
| 2005/0109052 A1 | 5/2005 | Albers et al. |
| 2005/0133082 A1 | 6/2005 | Konold et al. |
| 2005/0210907 A1 | 9/2005 | Gillan et al. |
| 2005/0217485 A1 | 10/2005 | Olapinski et al. |
| 2005/0218535 A1 | 10/2005 | Maisotsenko et al. |
| 2005/0257551 A1 | 11/2005 | Landry |
| 2006/0042295 A1 | 3/2006 | Assaf |
| 2006/0070728 A1 | 4/2006 | Shin et al. |
| 2006/0124287 A1 | 6/2006 | Reinders |
| 2006/0156750 A1 | 7/2006 | Lowenstein et al. |
| 2006/0156761 A1 | 7/2006 | Mola et al. |
| 2006/0278089 A1 | 12/2006 | Theilow |
| 2007/0169916 A1 | 7/2007 | Wand et al. |
| 2007/0175234 A1 | 8/2007 | Pruitt |
| 2007/0234743 A1 | 10/2007 | Assaf |
| 2008/0127965 A1 | 6/2008 | Burton |
| 2008/0156471 A1 | 7/2008 | Han et al. |
| 2008/0196758 A1 | 8/2008 | McGuire |
| 2008/0203866 A1 | 8/2008 | Chamberlain |
| 2008/0302357 A1 | 12/2008 | DeNault |
| 2008/0314567 A1 | 12/2008 | Noren |
| 2009/0000732 A1 | 1/2009 | Jacobine et al. |
| 2009/0056919 A1 | 3/2009 | Hoffman et al. |
| 2009/0095162 A1 | 4/2009 | Hargis et al. |
| 2009/0126913 A1 | 5/2009 | Lee et al. |
| 2009/0173096 A1 | 7/2009 | Wohlert |
| 2009/0183857 A1 | 7/2009 | Pierce et al. |
| 2009/0200022 A1 | 8/2009 | Bravo et al. |
| 2009/0238685 A1 | 9/2009 | Santa Ana |
| 2010/0000247 A1 | 1/2010 | Bhatti et al. |
| 2010/0012309 A1 | 1/2010 | Uges |
| 2010/0018322 A1 | 1/2010 | Neitzke et al. |
| 2010/0051083 A1 | 3/2010 | Boyk |
| 2010/0077783 A1 | 4/2010 | Bhatti et al. |
| 2010/0084120 A1 | 4/2010 | Yin et al. |
| 2010/0170776 A1 | 7/2010 | Ehrenberg et al. |
| 2010/0319370 A1 | 12/2010 | Kozubal et al. |
| 2011/0073290 A1 | 3/2011 | Chang et al. |
| 2011/0100618 A1 | 5/2011 | Carlson |
| 2011/0101117 A1 * | 5/2011 | Miyauchi .............. F24F 3/1417 236/44 A |
| 2011/0126885 A1 | 6/2011 | Kokotov et al. |
| 2011/0132027 A1 * | 6/2011 | Gommed .............. F24F 3/1417 62/477 |
| 2011/0209858 A1 | 9/2011 | Konno |
| 2012/0052785 A1 | 3/2012 | Nagamatsu et al. |
| 2012/0114527 A1 | 5/2012 | Hoglund et al. |
| 2012/0118148 A1 | 5/2012 | Culp et al. |
| 2012/0118155 A1 | 5/2012 | Claridge et al. |
| 2012/0125020 A1 | 5/2012 | Vandermeulen et al. |
| 2012/0125021 A1 | 5/2012 | Vandermeulen et al. |
| 2012/0125031 A1 | 5/2012 | Vandermeulen et al. |
| 2012/0125581 A1 | 5/2012 | Allen et al. |
| 2012/0131937 A1 | 5/2012 | Vandermeulen et al. |
| 2012/0131938 A1 | 5/2012 | Vandermeulen et al. |
| 2012/0131939 A1 | 5/2012 | Vandermeulen et al. |
| 2012/0132513 A1 | 5/2012 | Vandermeulen et al. |
| 2012/0152318 A1 | 6/2012 | Kee |
| 2012/0186281 A1 | 7/2012 | Vandermeulen et al. |
| 2013/0056177 A1 | 3/2013 | Coutu et al. |
| 2013/0101909 A1 | 4/2013 | Fasold et al. |
| 2013/0186121 A1 | 7/2013 | Erb et al. |
| 2013/0199220 A1 | 8/2013 | Ma et al. |
| 2013/0227982 A1 | 9/2013 | Forkosh |
| 2013/0255287 A1 | 10/2013 | Forkosh |
| 2013/0340449 A1 | 12/2013 | Kozubal et al. |
| 2014/0054004 A1 | 2/2014 | LePoudre et al. |
| 2014/0054013 A1 | 2/2014 | LePoudre et al. |
| 2014/0150481 A1 | 6/2014 | Vandermeulen |
| 2014/0150656 A1 | 6/2014 | Vandermeulen |
| 2014/0150657 A1 | 6/2014 | Vandermeulen et al. |
| 2014/0150662 A1 | 6/2014 | Vandermeulen et al. |
| 2014/0223947 A1 | 8/2014 | Ranjan et al. |
| 2014/0245769 A1 | 9/2014 | Vandermeulen et al. |
| 2014/0250935 A1 | 9/2014 | Prochaska et al. |

(56) References Cited

U.S. PATENT DOCUMENTS

| | | |
|---|---|---|
| 2014/0260367 A1 | 9/2014 | Coutu et al. |
| 2014/0260369 A1 | 9/2014 | LePoudre |
| 2014/0260371 A1 | 9/2014 | Vandermeulen |
| 2014/0260398 A1 | 9/2014 | Kozubal et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0264968 A1 | 9/2014 | Erb et al. |
| 2014/0360373 A1 | 12/2014 | Peacos et al. |
| 2014/0366567 A1 | 12/2014 | Vandermeulen |
| 2015/0107287 A1 | 4/2015 | Forkosh |
| 2015/0153210 A1* | 6/2015 | Bartlett ............ B67D 7/16 141/95 |
| 2015/0184876 A1 | 7/2015 | Vandermeulen et al. |
| 2015/0228993 A1 | 8/2015 | Mori et al. |
| 2015/0300754 A1 | 10/2015 | Vandermeulen et al. |
| 2015/0308711 A1 | 10/2015 | Gillan et al. |
| 2015/0316288 A1* | 11/2015 | Erickson ............ F24S 80/20 126/714 |
| 2015/0323216 A1 | 11/2015 | Wallin |
| 2015/0338140 A1 | 11/2015 | Vandermeulen |
| 2016/0187011 A1 | 6/2016 | Vandermeulen |
| 2016/0290665 A1 | 10/2016 | Vandermeulen et al. |
| 2016/0290666 A1 | 10/2016 | Coutu et al. |
| 2017/0045257 A1 | 2/2017 | Moffitt |
| 2017/0074530 A1 | 3/2017 | Kozubal |
| 2017/0102155 A1 | 4/2017 | Vandermeulen |
| 2017/0106639 A1 | 4/2017 | Vandermeulen et al. |
| 2017/0167794 A1 | 6/2017 | Vandermeulen |
| 2017/0184319 A1 | 6/2017 | Vandermeulen et al. |
| 2017/0241655 A1* | 8/2017 | LePoudre ............ F28F 9/26 |
| 2017/0292722 A1 | 10/2017 | Vandermeulen |
| 2018/0051897 A1 | 2/2018 | Vandermeulen et al. |
| 2018/0163977 A1 | 6/2018 | Vandermeulen |
| 2020/0096241 A1 | 3/2020 | Vandermeulen |
| 2020/0141593 A1 | 5/2020 | Vandermeulen et al. |
| 2020/0173671 A1 | 6/2020 | Rowe et al. |
| 2020/0182493 A1 | 6/2020 | Luttik |

FOREIGN PATENT DOCUMENTS

| | | |
|---|---|---|
| CN | 100476308 C | 4/2009 |
| CN | 101636630 A | 1/2010 |
| CN | 102282426 A | 12/2011 |
| CN | 202229469 U | 5/2012 |
| CN | 202734094 U | 2/2013 |
| EP | 0781972 A2 | 7/1997 |
| EP | 1120609 A1 | 8/2001 |
| EP | 1563229 A1 | 8/2005 |
| EP | 1781995 A1 | 5/2007 |
| EP | 2256434 A2 | 12/2010 |
| EP | 2306100 A1 | 4/2011 |
| EP | 2787293 A1 | 10/2014 |
| GB | 1172247 A | 11/1969 |
| JP | S54-77443 A | 6/1979 |
| JP | S62-297647 A | 12/1987 |
| JP | 02306067 A | 12/1990 |
| JP | H03-125830 A | 5/1991 |
| JP | H03-213921 A | 9/1991 |
| JP | H08-105669 A | 4/1996 |
| JP | H09-184692 A | 7/1997 |
| JP | H10-220914 A | 8/1998 |
| JP | H11-137948 A | 5/1999 |
| JP | H11-197439 A | 7/1999 |
| JP | H11-351700 A | 12/1999 |
| JP | 2000-230730 A | 8/2000 |
| JP | 2001-517773 A | 10/2001 |
| JP | 2002-206834 A | 7/2002 |
| JP | 2004-524504 A | 8/2004 |
| JP | 2005-134060 A | 5/2005 |
| JP | 2006-263508 A | 10/2006 |
| JP | 2006-529022 A | 12/2006 |
| JP | 2008-020138 A | 1/2008 |
| JP | 2009-517622 A | 4/2009 |
| JP | 2009-04273555 B2 | 6/2009 |
| JP | 2009-180433 A | 8/2009 |
| JP | 2009-192101 A | 8/2009 |
| JP | 2009-281668 A | 12/2009 |
| JP | 2009-293831 A | 12/2009 |
| JP | 2010002162 A | 1/2010 |
| JP | 201054136 A | 3/2010 |
| JP | 2010-247022 A | 11/2010 |
| JP | 2011-064359 A | 3/2011 |
| JP | 2011-511244 A | 4/2011 |
| JP | 201192815 A | 5/2011 |
| JP | 2011-163682 A | 8/2011 |
| JP | 2012-073013 A | 4/2012 |
| JP | 2013-064549 A | 4/2013 |
| KR | 10-2001-0017939 A | 3/2001 |
| KR | 2004-0026242 A1 | 3/2004 |
| KR | 10-0510774 B1 | 8/2005 |
| KR | 2014-0022785 A | 2/2014 |
| TW | 201009269 A | 3/2010 |
| WO | WO-1997021061 A1 | 6/1997 |
| WO | WO-1999022180 A1 | 5/1999 |
| WO | WO-2000011426 A1 | 3/2000 |
| WO | WO-2000055546 A1 | 9/2000 |
| WO | WO-2002066901 A1 | 8/2002 |
| WO | WO-2002086391 A1 | 10/2002 |
| WO | WO-2003004937 A1 | 1/2003 |
| WO | WO-2004046618 A1 | 6/2004 |
| WO | WO-2006006177 A1 | 1/2006 |
| WO | WO-2008037079 A1 | 4/2008 |
| WO | WO-2009094032 A1 | 7/2009 |
| WO | WO-2009144880 A1 | 12/2009 |
| WO | WO-2009157277 A1 | 12/2009 |
| WO | WO-2011062808 A1 | 5/2011 |
| WO | WO-2011161547 A2 | 12/2011 |
| WO | WO-2012071036 A1 | 5/2012 |
| WO | WO-2012082093 A1 | 6/2012 |
| WO | WO-2013172789 A1 | 11/2013 |

OTHER PUBLICATIONS

Open Absorption System for Cooling and Air Conditioning using Membrane Contactors Annual, Report 2006, Publication Number: Publication 260098, Project: 101310—Open Absorption System for Cooling and Air Conditioning using Membrane Contactors, Date of publication: Nov. 14, 2006, Author: Manuel Conde-Petit, Robert Weber, Contractor: M. Conde Engineering.

Open Absorption System for Cooling and Air Conditioning Using Membrane Contactors—Final Report, Publication Number: Publication 280139, Project: 101310—Open Absorption System for Cooling and Air Conditioning using Membrane Contactors, Date of publication: Aug. 7, 2008, Author: Viktor Dorer, Manuel Conde-Petit, Robert Weber, Contractor: M. Conde Engineering.

Conde-Petit, M. 2007. Liquid Desiccant-Based Air-Conditioning Systems—LDACS, Proc. of the 1st European Conference on Polygeneration—Technologies and Applications, 217-234, A. Coronas, ed., Tarragona—Spain, Oct. 16-17, Published by CREVER—Universitat Rovira I Virgili, Tarragona, Spain.

Conde-Petit, M. 2008. Open Absorption Systems for Air-Conditioning using Membrane Contactors,Proceedings '15. Schweizerisches Status-Seminar «Energie- und Umweltforschung im Bauwesen»', Sep. 11-12—ETH Zurich, Switzerland. Published by BRENET—Eggwilstr. 16a, CH-9552 Bronschhofen—Switzerland (brenet@vogel-tech.ch).

Third Party Observations for PCT/US2011/037936, dated Sep. 24, 2012.

Ashrae, et al., "Desiccant Dehumidification and Pressue Drying Equipment," 2012 ASHRAE Handbook—HVAC Systems and Equipment, Chapter 24, pp. 24.1-24.12.

Beccali, et al., "Energy and Economic Assessment of Desiccant Cooling," Solar Energy, Issue 83, pp. 1828-1846, Aug. 2009.

Fimbres-Weihs, et al., "Review of 3D CFD modeling of flow and mass transfer in narrow spacer-filled channels in membrane modules," Chemical Engineering and Processing 49 (2010) pp. 759-781.

Lachner, "An Investigation into the Feasibility of the Use of Water as a Refrigerant," International Refrigeration and Air Conditioning Conference, 723:1-9 (2004).

(56) References Cited

OTHER PUBLICATIONS

Li, F., et al., "Novel spacers for mass transfer enhancement in membrane separations," Journal of Membrane Science, 253 (2005), pp. 1-12.
Li, Y., et al., "CFD simulation of fluid flow through spacer-filled membrane module: selecting suitable cell types for periodic boundary conditions," Desalination 233 (2008) pp. 351-358.
Liu, et al., "Research Progress in Liquid Desiccant Air Conditioning Devices and Systems," Frontiers of Energy and Power Engineering in China, vol. 4, Issue 1, pp. 55-65, Feb. 2010.
Lowenstein, "A Solar Liquid-Desiccant Air Conditioner," Solar 2003, Proceedings of the 32nd ASES Annual Conference, Austin, TX, Jul. 2003.
Mathioulakis, "Desalination by Using Alternative Energy," Desalination, Issue 203, pp. 346-365, 2007.
Perry "Perry's Chemical Engineers handbook" 1999 McGraw Hill p. 11-52,11-53.
Refrigerant—Random House Kernerman Webster's College Dictionary, "Refrigerant," Random House, <https://thefreedictionary.com/refrigerant> (2010).
Russell, et al., "Optimization of Photovolatic Thermal Collector Heat Pump Systems," ISES International Solar Energy Conference, Atlanta, GA, vol. 3, pp. 1870-1874, May 1979.
Siphon—Encyclopedia Americana. "Siphon." Grolier Online, 2015. Web. Apr. 3, 2015. 1 page.
Welty, "Liquid Desiccant Dehumidification," Engineered Systems, May 2010, vol. 27 Issue 5, p. 34.
International Search Report and Written Opinion for International Application No. PCT/US2018/058750 dated Mar. 4, 2019.

\* cited by examiner

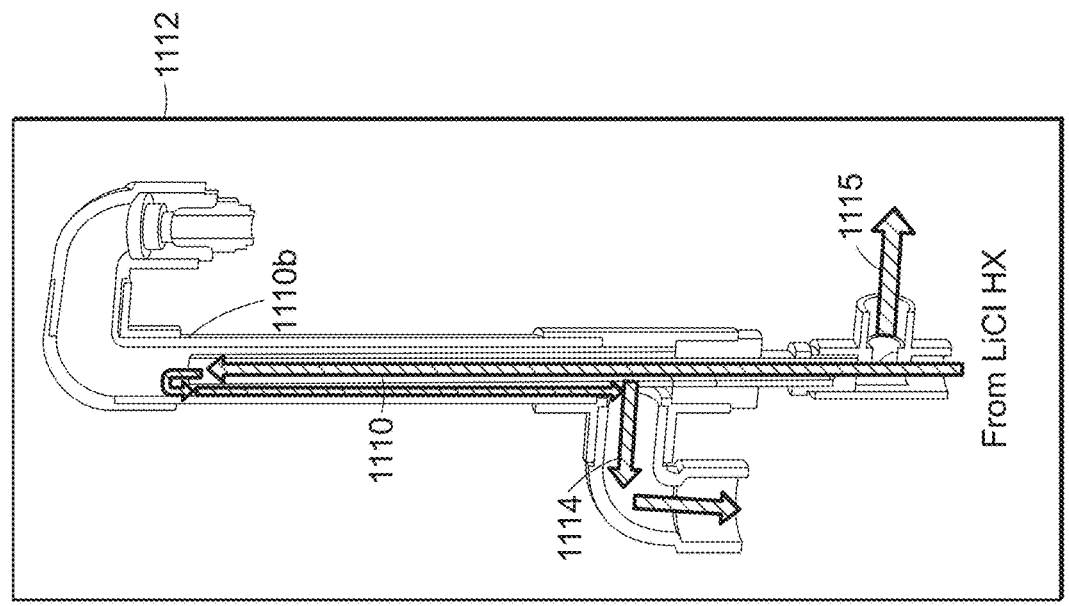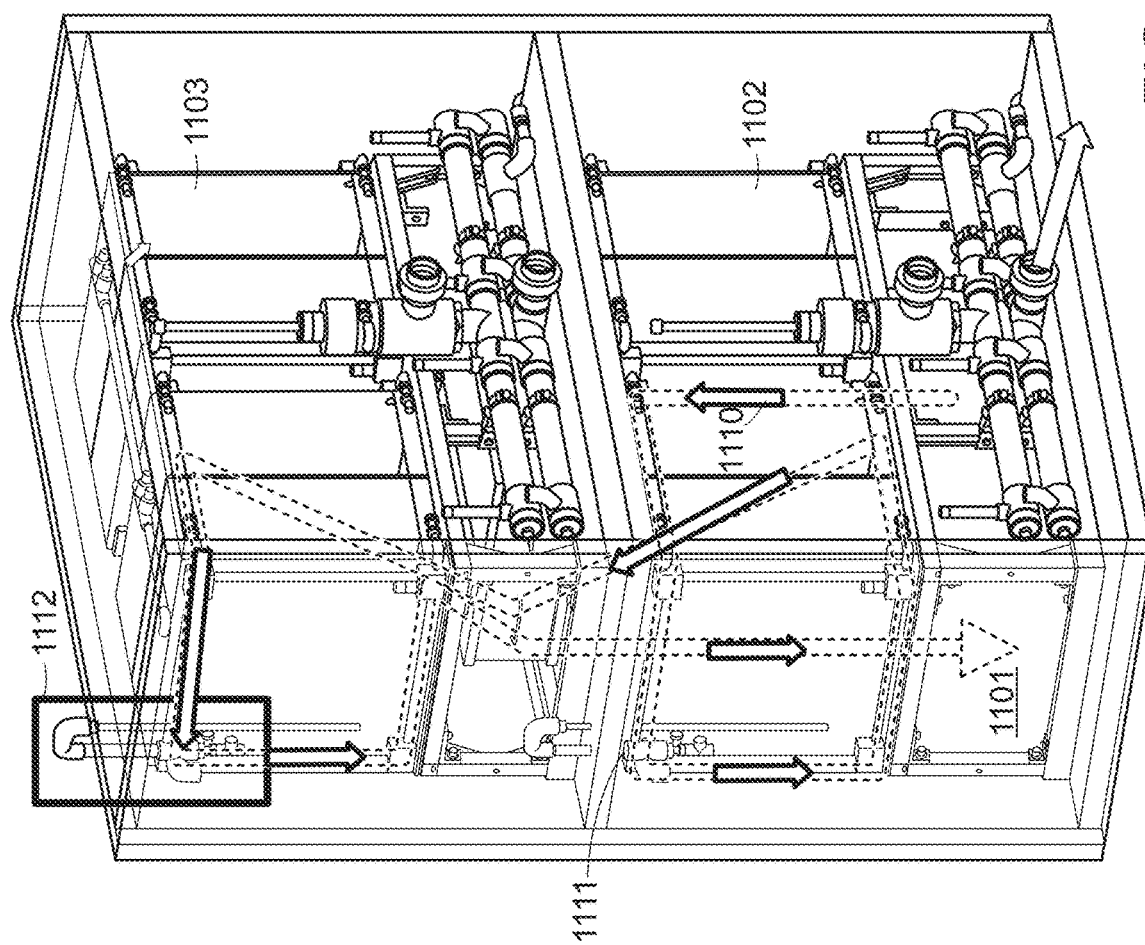
FIG. 11C

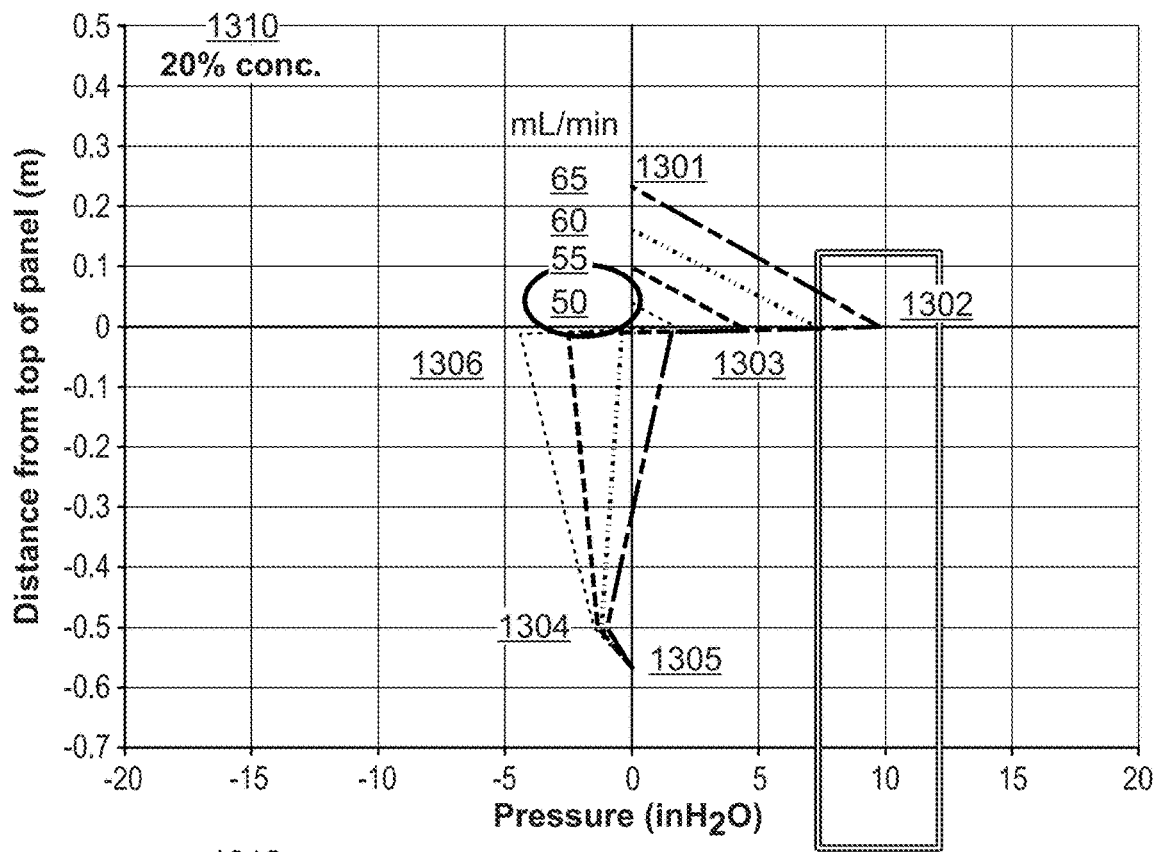
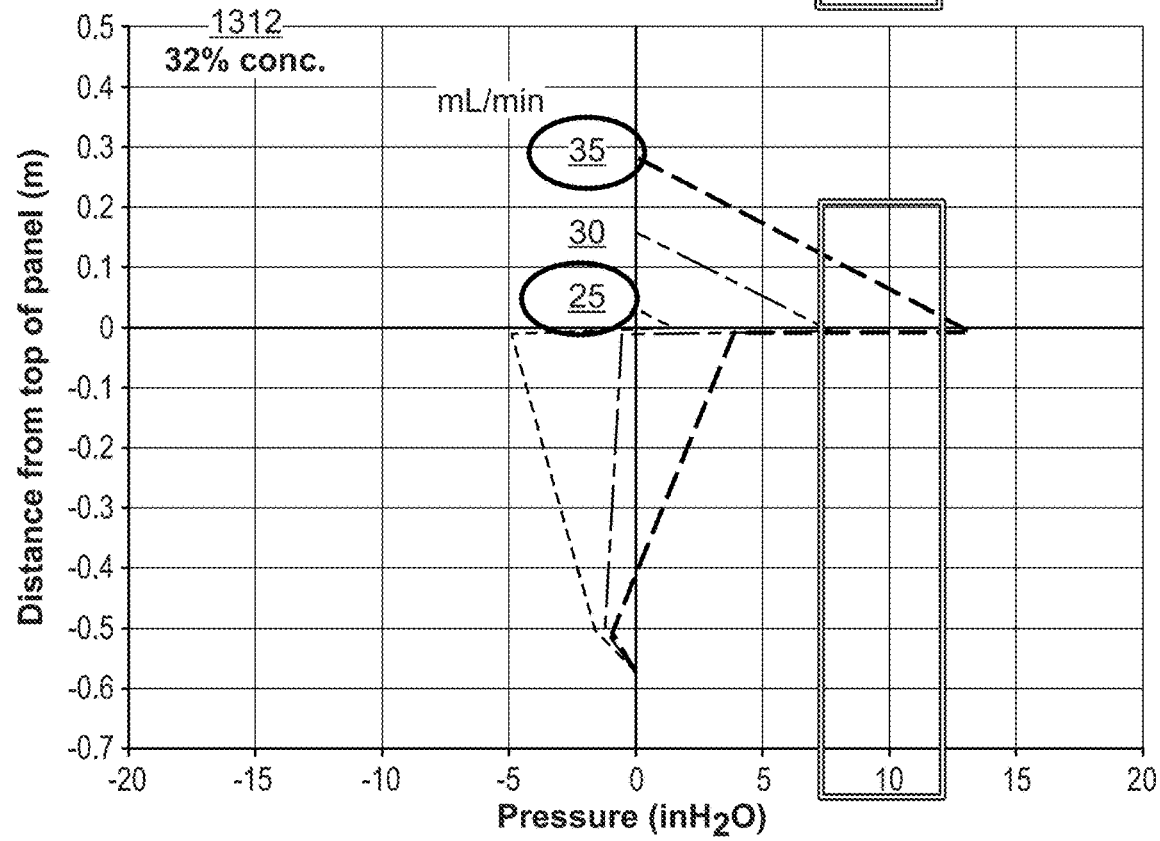
FIG. 13

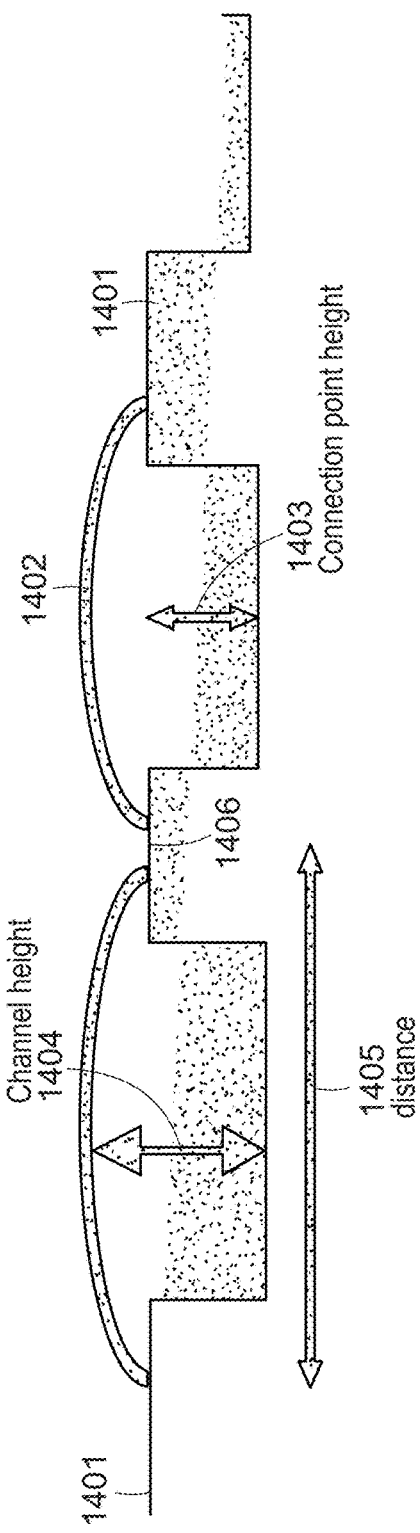
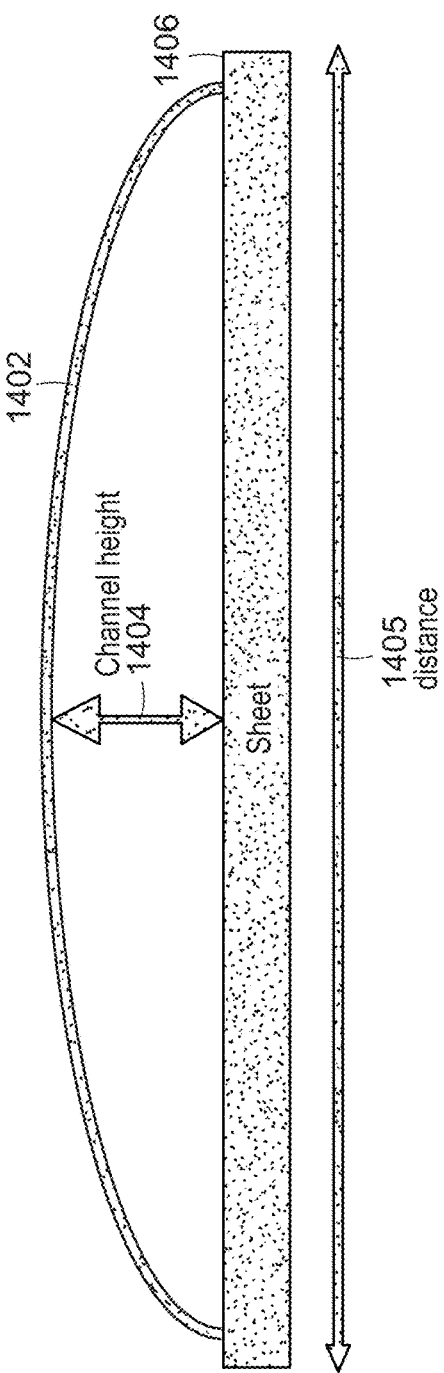
FIG. 14A
FIG. 14B

METHODS AND APPARATUS FOR UNIFORM DISTRIBUTION OF LIQUID DESICCANT IN MEMBRANE MODULES IN LIQUID DESICCANT AIR-CONDITIONING SYSTEMS

CROSS REFERENCE TO RELATED APPLICATION

This application claims priority from U.S. Provisional Patent Application No. 62/580,222 filed on Nov. 1, 2017 entitled METHODS AND APPARATUS FOR DISTRIBUTION OF LIQUID DESICCANT IN MEMBRANE MODULES IN LIQUID DESICCANT AIR-CONDITIONING SYSTEMS, which is hereby incorporated by reference.

BACKGROUND

The present application relates generally to liquid desiccant air-conditioning systems and, more particularly, to membrane modules used in conditioners and regenerators of such air-conditioning systems.

Liquid desiccant air-conditioning systems are known in the art as disclosed, e.g., in U.S. Pat. No. 9,273,877 incorporated by reference herein. These systems have been demonstrated to provide significant savings in energy usage and costs.

SUMMARY

Various embodiments disclosed herein relate to liquid desiccant air-conditioning systems providing a uniform liquid desiccant flow distribution and wetting out of membranes used in membrane-modules. The system combines liquid desiccant pressure control in the panels with a well-defined very narrow uniform liquid desiccant channel formed by a pattern of spaced-apart features. These features, which can e.g., be spaced apart 1-3 inches, can be thermoformed or embossed on the panel with the membrane heat-sealed against them. Alternatively, the features can be a heat-seal pattern on an otherwise flat panel sheet. The pressure control device can be, e.g., an overflow tube or a spring activated pressure control. The combination of pressure and flow control with a narrow uniform desiccant channel between the membrane and the sheet can ensure 90% plus coverage of the membrane by the liquid desiccant through a geometry of the liquid desiccant channel that allows for constant pressure liquid desiccant flow, rather than by using wicking materials, or by surface treatments to reduce the hydrophobicity of the plate materials or by using more costly materials.

In one or more embodiments, the thin film achieves flows of about 1 to 15 mm/min at 20-35% concentration liquid desiccant and for temperatures between 0 and 60 C in a 0.1 to 0.2 mm liquid desiccant film. Lower temperatures and higher concentrations require wider channels. Higher temperatures and lower concentrations would require either higher flows or narrower channels. Exemplary solutions for creating a 0.1 to 0.2 mm channel include 7000 Dots at 0.14 mm height for a short panel, or 1-200 dots at 0 mm height. A flow model using membrane stretch, hydrophobicity, concentration, and temperature of the liquid desiccant can be used to optimize the panel for certain applications.

For different temperatures and concentrations of liquid desiccant, the flow rate will differ depending on the pressure driving the flow through the channel. At a constant pressure drop, the flow rate would fall from about 0.05 l/m per channel at high temperatures and low concentrations to 0.01 l/min at high concentrations and low temperatures. Very low flow rates increase the change in concentration of the liquid desiccant and thus reduces the rate of humidification or dehumidification. Thus, the latent effectiveness of the panel is reduced. High flows of liquid desiccant in the conditioner creates a heat loss, e.g., when hot liquid desiccant is moved from the regenerator to the conditioner, the load on the evaporator side of the compressor is increased. This represents an efficiency loss. For concentrations around 25% and temperatures around 20 C, it is desirable to maintain a desiccant flow rate of about 0.03 liter/panel. At that rate, the panels can provide good coverage.

A heat exchanger for use in a desiccant air conditioning system in accordance with one or more embodiments comprises a plurality of membrane-covered structures facing each other in a generally parallel arrangement and being spaced apart to define air channels therebetween through which an air flow to be treated by the desiccant air conditioning system can flow. Each of the membrane-covered structures comprise a structure having a hollow interior portion defining a heat transfer fluid channel through which a heat transfer fluid can flow. The structure also has one or more outer hydrophobic polymer surfaces. Each membrane-covered structure also has one or more hydrophobic polymer membranes covering the one or more outer surfaces of the structure to define a liquid desiccant gap therebetween through which a liquid desiccant can flow. Each membrane is heat sealed to the outer surface of the structure at discrete locations spaced apart by less than 50 mm on the outer surface to define liquid desiccant flow channels, wherein the liquid desiccant flow channels have a channel height measured from the outer surface to the membrane not exceeding 0.5 mm. The heat exchanger also includes a liquid desiccant pressure regulator connected to a liquid desiccant inlet of the heat exchanger. The pressure regulator is configured to maintain a positive pressure at the liquid desiccant flow channels not exceeding a given preset value at a flow rate sufficient to fill each of the liquid desiccant flow channels across a given range of liquid desiccant temperature and concentration conditions. The liquid desiccant pressure regulator is configured to divert a portion of the liquid desiccant flowing to the heat exchanger to a liquid desiccant tank in order to maintain a constant liquid desiccant pressure at the liquid desiccant flow channels.

BRIEF DESCRIPTION OF THE FIGURES

FIG. 11C shows a liquid desiccant pressure control device in a liquid desiccant air conditioning unit in accordance with one or more embodiments.

FIGS. 14A-14K illustrate various exemplary membrane structures for a liquid desiccant air conditioning unit in accordance with one or more embodiments.

DETAILED DESCRIPTION

Figure 1:
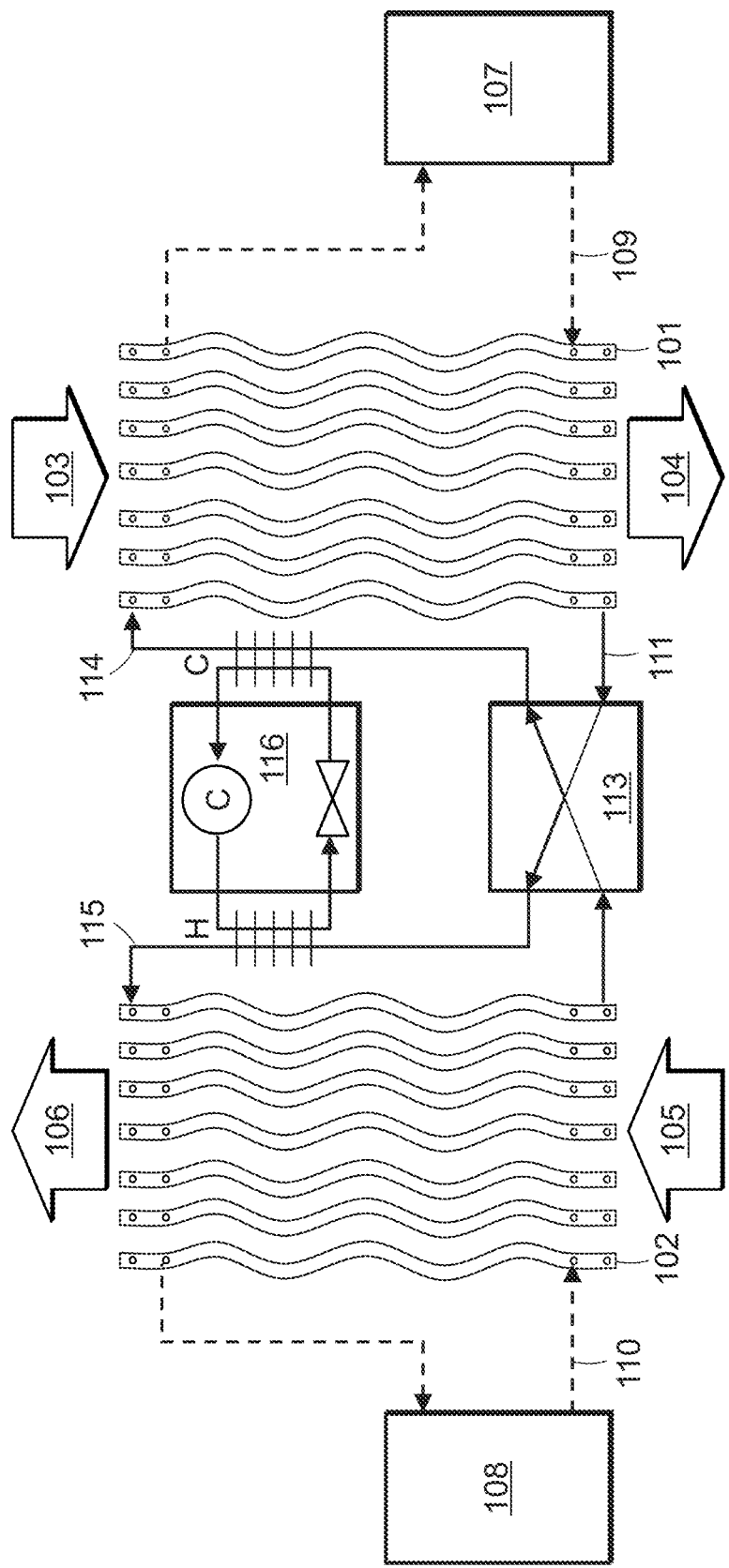
FIG. 1 illustrates an exemplary prior art 3-way liquid desiccant air conditioning system using a chiller or external heating or cooling sources.

U.S. Pat. No. 9,243,810, which is incorporated by reference herein, discloses a new kind of liquid desiccant system. The system includes a conditioner 101 and the regenerator 102, both of which comprise a set of plate structures that are internally hollow. Heat transfer fluid is generated in the cold and hot sources 107 and 108 and entered into the plates 101, 102. Liquid desiccant solution at 114, 115 is brought onto the outer surface of the plates. The liquid desiccant runs behind a thin membrane that is located between the airflows 103, 105 and the surface of the plates. The liquid desiccant from the plates is collected at 111 and 112. Heat exchanger 113 is used to minimize heat losses as the liquid desiccant is transferred from the cold plates where it is diluted as the desiccant absorbs humidity to hot plates 102 where the desiccant is reconcentrated before returning to the conditioner panels 101. External sources of hot and cold 107 and 108 can also be a chiller system 116, where the evaporator and regenerator can be used to directly cool and heat the liquid desiccant or in other configurations to heat and cool the heat transfer fluid. The conditioner processes air 103 and supplies 104, while the regenerator will process a mix of exhaust and outside air 105 and exhaust 106. The compressor 116 is shown to heat the desiccant 114 and 115, but can also operate as a heat source using refrigerant to water heat exchanger as shown in prior art.

The heat exchanger 113 takes the cold liquid desiccant 111 from the conditioner and warms it up prior to it entering the regenerator at 115. The hot liquid desiccant 112 is cooled before it enters the conditioner at 114. 109 and 110 show the flows of heat transfer fluid to the conditioner and regenerator from the cold and the hot source. The role of heat exchanger 113 is critical. Exchanging the liquid desiccant between the cold conditioner and hot regenerator can lead to a significant heat losses as the cold and hot source need to do more work. Minimizing the flows of liquid desiccant reduces that heat loss for a given size heat exchanger or allow a smaller heat exchanger to be used. Modelling of similar systems have shown that over a wide range of flows and conditions lower flows of liquid desiccant reduce the latent effectiveness of the conditioner or regenerator, but that loss in effectiveness at lower rates is smaller than the gain from reduced heat losses.

Figure 2:
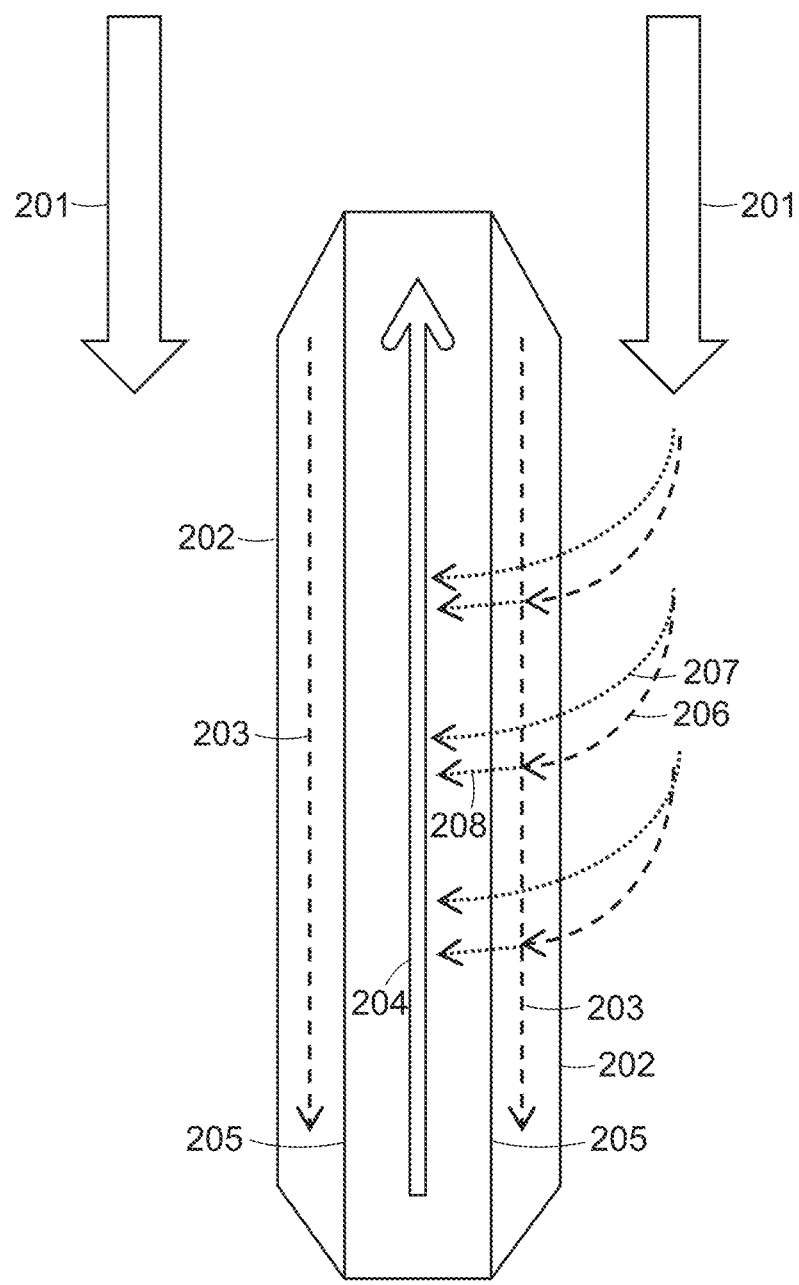
FIG. 2 illustrates an exemplary single membrane plate in the liquid desiccant system of FIG. 1.

FIG. 2 shows a cross section of a single membrane-plate assembly with the cooling fluid (heat transfer fluid) 204 flowing through the center of the plate in counter flow with the airflow 201. The liquid desiccant 203 flows over the outer surface of the panels 205 and behind the membranes 202. In the conditioner, heat is absorbed directly by the heat transfer fluid 208 from the air in 207 or indirectly as the humidity in the air is absorbed by the liquid desiccant 206. The heat generated by the absorption is then transferred to the heat transfer fluid 208.

Figure 3:
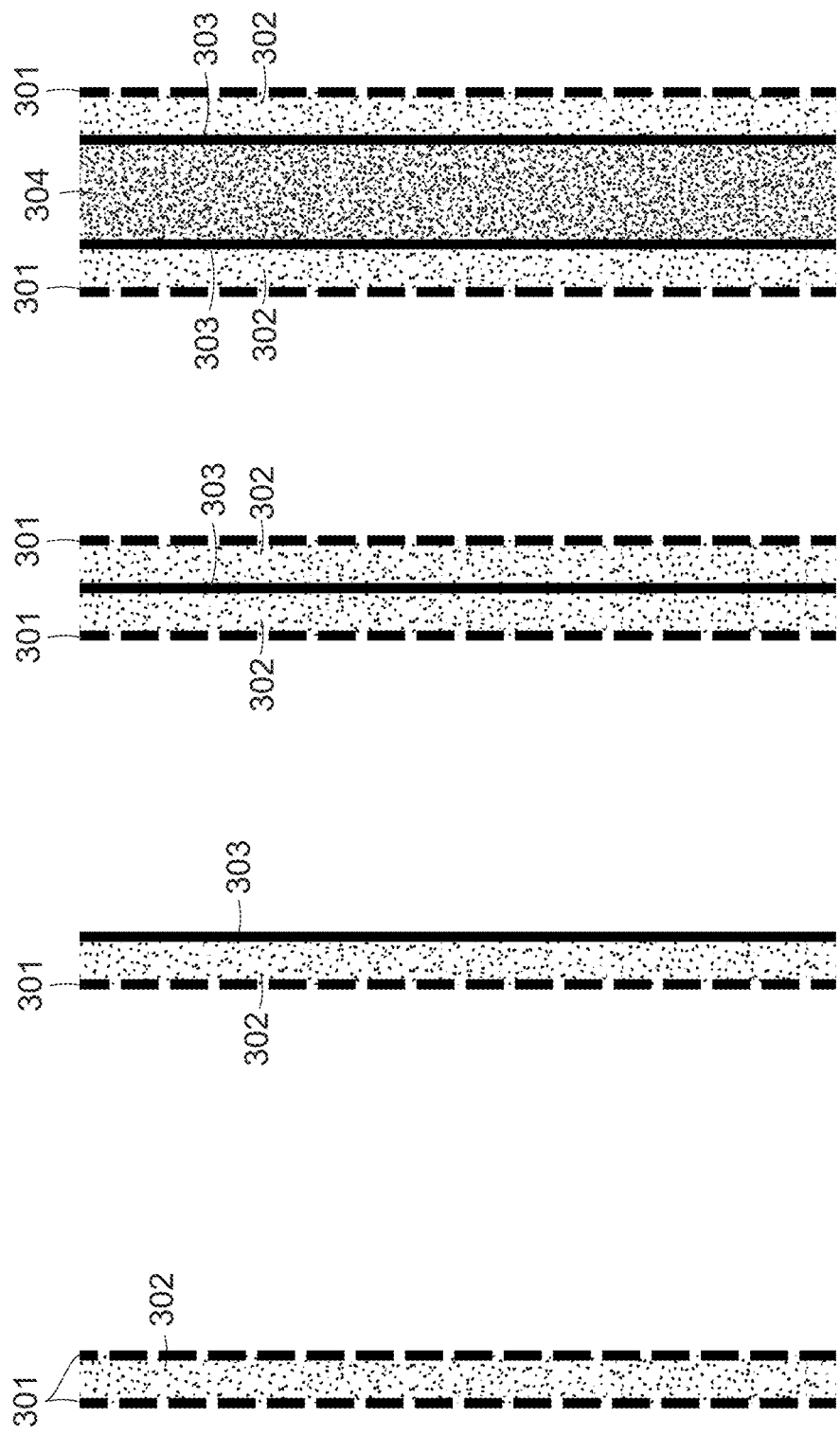
FIGS. 3A-3D illustrate various prior art membrane panel constructions.

FIG. 3D shows the same structure of a three fluid heat exchanger with the heat transfer fluid 304 flowing between panels 303 and the liquid desiccant flowing between the panels 303 and membranes 301. Alternatives are shown in FIGS. 3A, 3B, 3C where a similar thin layer of liquid desiccant is shown in a two fluid heat exchanger with liquid desiccant and air, where a thin film of liquid desiccant flows either between a plate 303 and a membrane 301 or between two membranes 301.

Figure 4:
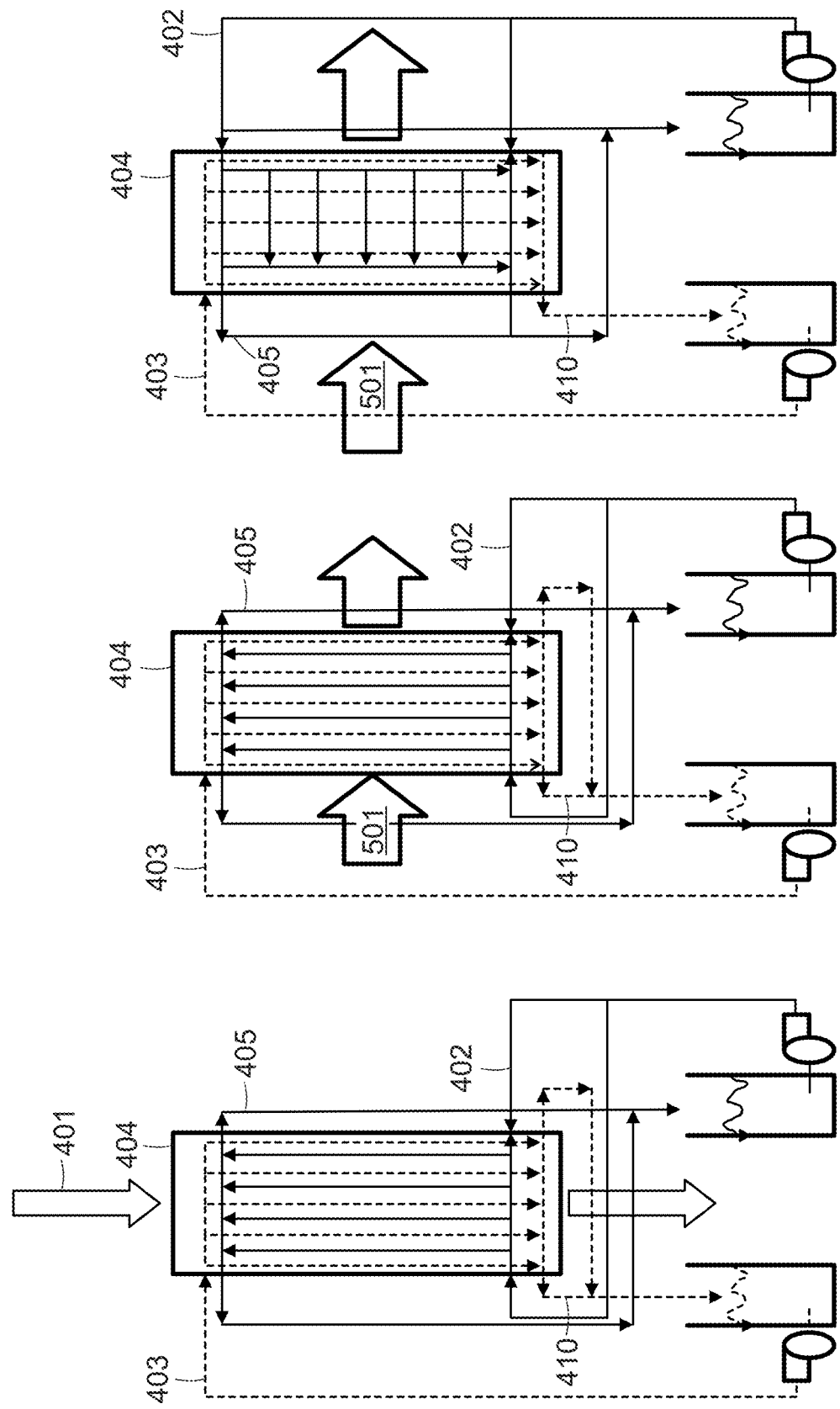
FIG. 4 illustrates horizontal and vertical fluid flows through liquid desiccant air conditioning systems.

FIG. 4 shows various sets of panels 404 in horizontal and vertical orientations. Counter flow of air 401 and water (or other heat transfer fluid) 402/405 maximizes performance of the heat exchanger. Desiccant flow 403 to 410 can be parallel, cross or counter flow. FIG. 4 shows embodiments requiring a vertical orientation of the liquid desiccant in a partially gravity driven flow. The air and water flows can both be horizontal and vertical. Optimization of the form factor for small units in among others selected residential and transportation applications make it desirable to enable all three flows to be horizontal. The current application describes how this can be done.

U.S. Pat. No. 9,101,874 describes how syphoning can be used to stop bulging of membranes. Bulging disrupts airflow. The negative pressure behind the membrane keeps it flat. This allows wider spacing of the dots that seal the membrane to the double plates surrounding the heat transfer fluid. The patent also discloses vertical and horizontal flow, cross and counter flow. The patent also further discloses how wicking materials can be used as one of the surfaces or as a separate sheet to optimize wetting out.

Figure 5:
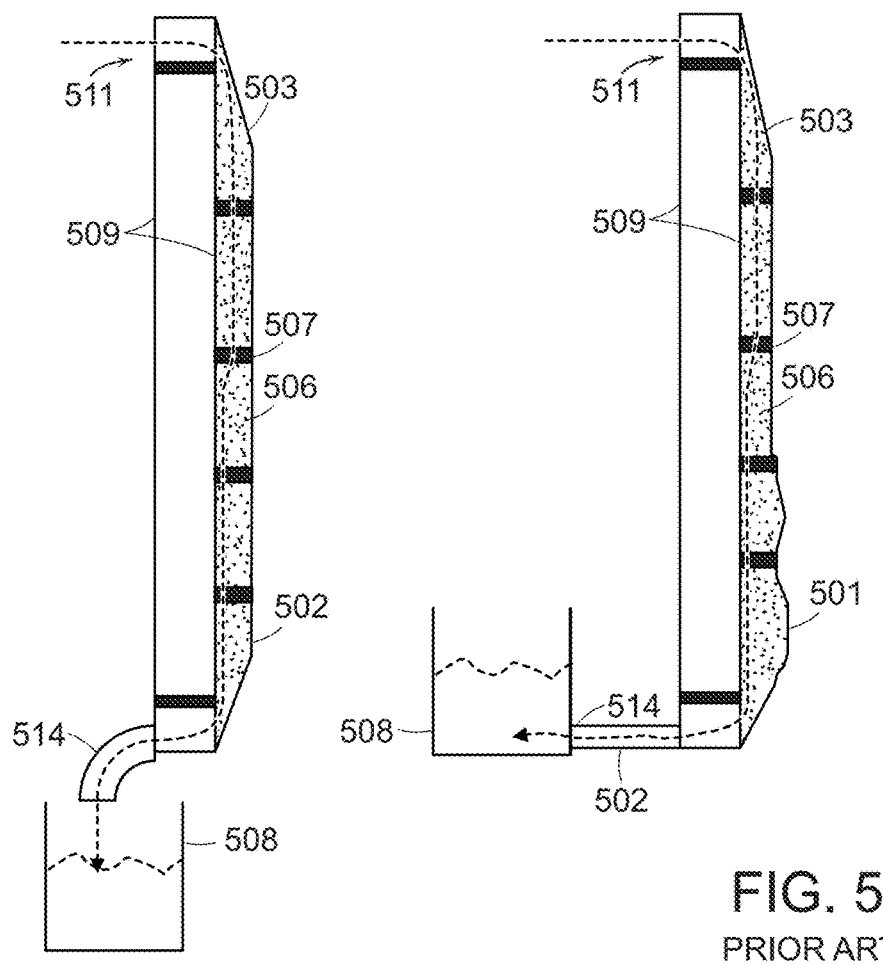
FIG. 5 illustrates use of siphoning liquid desiccant to inhibit membrane bulging in a panel assembly.
Figure 6:
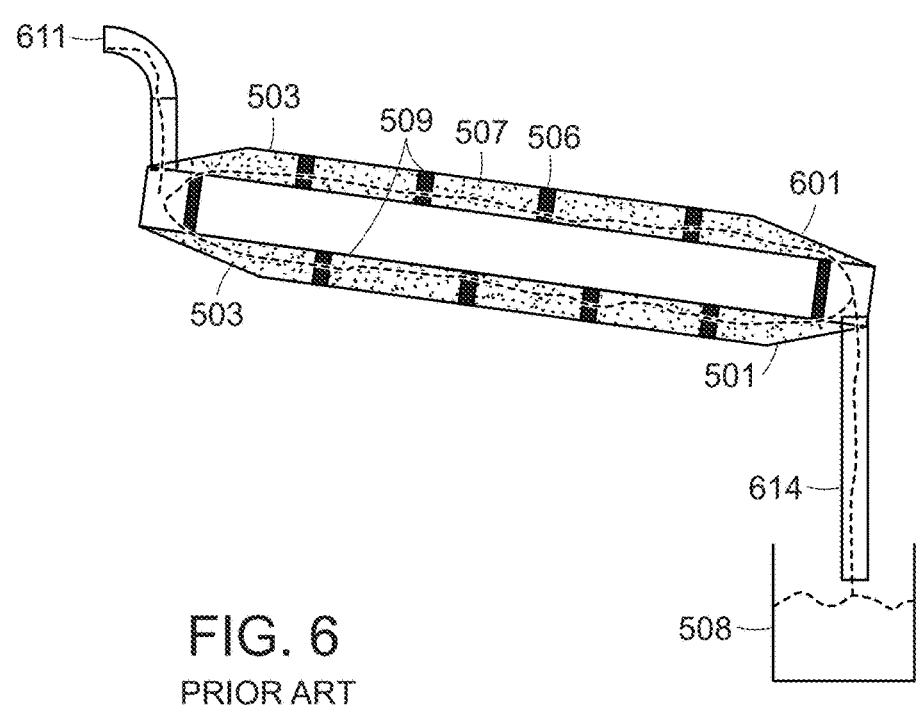
FIG. 6 shows generally horizontal fluid flow in a prior art membrane panel assembly.

FIGS. 5 and 6 of the present application (as disclosed in U.S. Pat. No. 9,101,874) illustrate how the liquid desiccant enters the desiccant channel at 511 and flows between membrane 503 and panels 509. To limit bulging of the membrane, it is connected at points 507 leaving the panel at 502 back to tank 508. Without syphon 514, the membrane will bulge at 501 and partially or completely block the air channel Mixing of the liquid desiccant flow 506 is disclosed to maximize absorption and desorption and minimize heat transfer resistance. The membrane is sealed at 507 to sheet 509. Heat transfer fluid flows on the inside of sheet 509. The pressure at 503 is positive. Tank 508 is used to store the desiccant.

While the flow in FIG. 5 is described as driven by gravity and syphoning, a near horizontal panel in FIG. 6 is shown with a pressure 611 provided at the beginning of the panel and a large syphon 614 at the end, which again seeks to minimize bulging at 601 by sucking the membrane flat against the desiccant. One advantage described is that syphoning reduces the need for dots between membrane 503 and plate 509. To drain most of the liquid desiccant during maintenance a slight angle is required. The syphoning feature or negative pump suction can be used to minimize the need to connect support plates 509.

A challenge is that significant syphoning of the liquid desiccant tends to draw in air into the desiccant, which when captured in the liquid heat exchanger will reduce its effectiveness. Being able to operate the liquid desiccant channel under mostly positive pressure with no or little syphon removes that problem and makes the design more robust.

Figure 7:
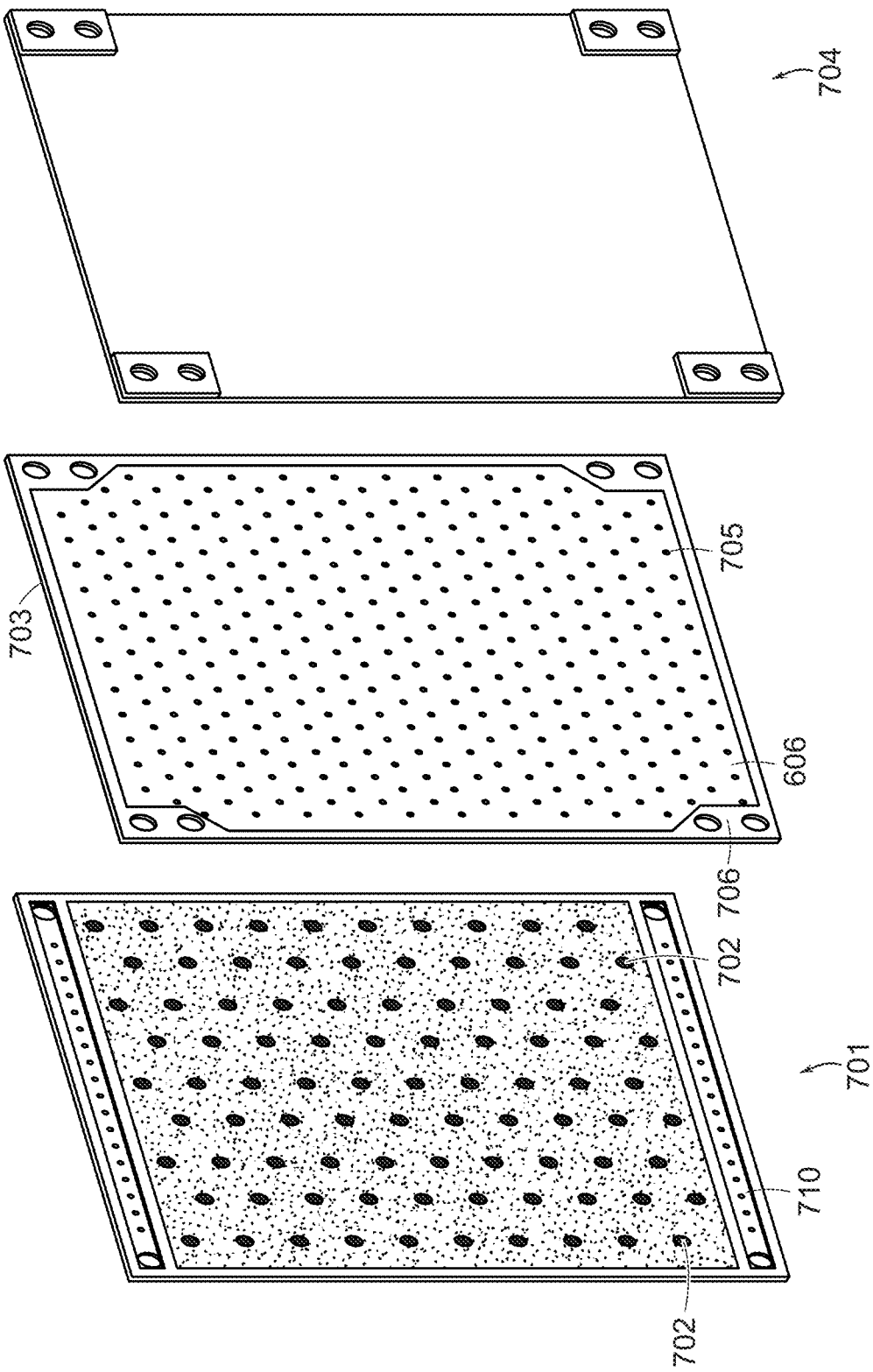
FIG. 7 illustrates construction of an exemplary prior art panel assembly.

FIG. 7 discloses a prior art membrane panel assembly for structuring the heat transfer and desiccant channels. It shows three layers. The water (or other heat transfer fluid) channel 701 can be formed with glue lines. Since the water channel operates under negative pressure, netting 702 is added and kept in place with glue dots 705, which connect the netting to plates 703 on both sides of the water channel Plate 703 can be flat or thermoformed to create a 0.1 to 0.5 mm channel for the liquid desiccant with the dots 705 determining the height of the channel Membrane 704 is sealed to the thermoformed panel at dots 705. The desiccant flows through channel 706 to manifold 710. A challenge is how to maintain optimal distribution and coverage of the liquid desiccant in the channel, while the desiccant changes in temperature and concentration and thus in viscosity.

Figure 8:
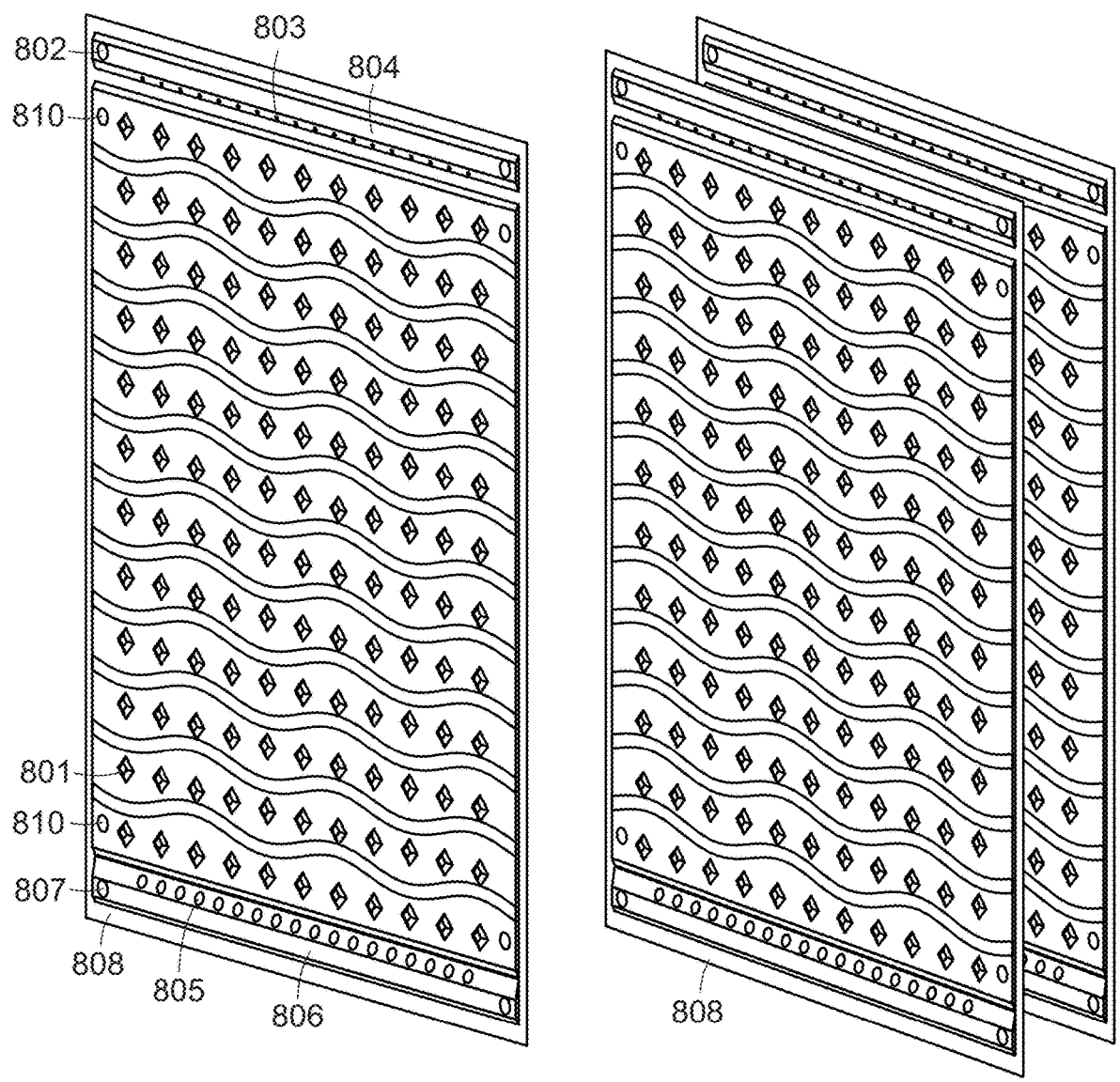
FIG. 8 illustrates a prior art panel assembly with raised features.

FIG. 8 shows features 801 raised above the surface of the plate to provide for mixing of the desiccant, for bonding the membrane to the plate and to set a uniform firm distance between the membrane and the plate for uniform heat and water vapor transport to occur. Desiccant enters the panels at 802 and is distributed over the width of the plates through channel 804 and moves from the center to the front of the panel 803 down the panel, and exits at 805 and via 806 to be collected at manifold 807. Border 808 can be used to connect two thermoformed panels together to form a central water channel with exit and entry 810. The height of the features into the desiccant channel are disclosed as typically 0.5 mm. While the water channel height is typically 1.5 and 2 mm.

Figure 9:
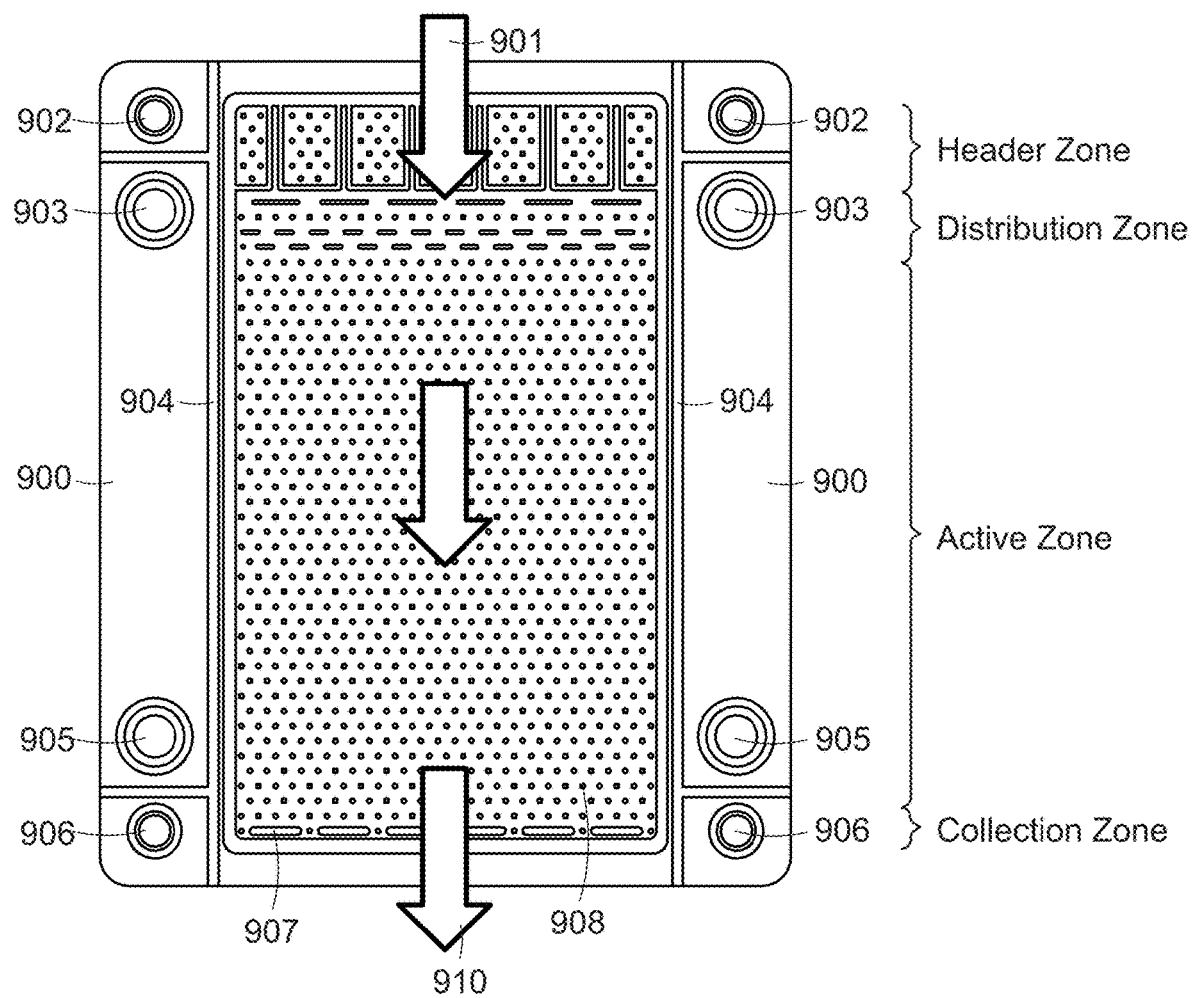
FIG. 9 shows a panel assembly with a liquid desiccant channel.

FIG. 9 shows a further prior art panel design with thermoformed features. The airflow 901 flows over thermoformed sheet 900 covered by a membrane (not shown). The desiccant enters through 902 and exits via 906. The water enters through 903 and exits through 905. The membrane is attached to the raised features 908 and 904 that also determine the height of the desiccant channel.

All these designs have a similar challenge: how to maintain coverage and distribution of a very thin liquid desiccant film behind a membrane, while the temperature and concentration of the liquid desiccant changes. Various embodiments disclosed herein address these challenges.

The performance of liquid desiccant air-conditioning systems depends crucially on the ability of the liquid desiccant to dehumidify air while it is being cooled or heated simultaneously by a heat transfer fluid. U.S. Pat. No. 9,101,874 discloses a variety of membrane module structures, including hollow plates and tubes. The corrosion resistant heat exchangers use polymers to contain the liquid desiccants. Most metals will corrode quickly by highly concentrated liquid desiccants. The patents describe how the desiccant is contained by a highly porous membrane that allows humidity to pass through, but contains the liquid desiccant. Both the polymer and the membrane are highly hydrophobic, the efficiency of such a system is driven by a combination of low flows of liquid desiccant and high coverage of the panel with liquid desiccant.

The liquid desiccant flow is about 1/10th to 1/20th of the flows or air and water in terms of weight.

It has been found that high coverage of the panel by liquid desiccant requires the film of liquid desiccant to be very thin (e.g., 0.1 to 0.3 mm) and uniform. The wetting out of the membrane by the liquid desiccant is an important factor improving panel efficiency. However, between a hydrophobic membrane and a hydrophobic panel liquid desiccants will tend to concentrate on parts of the panel in "rivulets" of desiccant behind the membrane. With contact angles between desiccant and various plastics exceeding 100 degrees, the desiccant will not spread out. Reducing hydrophobicity by adding wicking materials has been disclosed. While that improves spreading out of the desiccant, it tends to cause most of the desiccant to flow only along particular paths, leading to great differences in the distribution of flowrates.

Extensive experimentation and modelling has shown that geometry is the critical factor driving the wetting out of the membrane. By pushing desiccant under pressure through the channel, the desiccant spreads out to fill the complete channel. The viscosity of the liquid desiccant will determine the flow rate and pressures at which full wetting out can be maintained. At high dynamic viscosities, flow rates will decrease at constant pressure. When the viscosity of the liquid desiccant is lowered flow rates will increase at constant pressure or pressure needs to drop to keep the flow rate constant. Dynamic viscosity if the liquid desiccant is reduced by increasing temperature and by lowering the concentration of the desiccant. To maintain full wet out, the pressure in the panel will need to remain positive.

In a thin film of liquid desiccant, channel the height of the channel is the key determinant of flow rates. If the channel is too high, wetting out will drop. The critical factors that determine channel height are the height of the connection points between the membrane and the panel and the bulging or flexing of the membrane between the connection points. Optimizing the number of connection points is thus a critical design variable. More connection points reduces bulging. Also connection points do not expose the air to desiccant and thus reduce the dehumidification capacity of the panel. With 3000-5000 dots for a 300 by 500 mm panel, the dots can use more than 10% of the total area. This is acceptable and has led to good experimental results with latent effectiveness of panels as much as 90%+ of the theoretical optimum.

The connection points of a given pattern and height can be created through thermoforming as described in the existing art. Injection molding and embossing are two other options. Flat panels can also be used, but require a bigger distance between connection points. Creep occurs where the membrane and the panel first touch. The open structure of the membrane combined with the heat-sealing makes this a potentially vulnerability for the membrane. Longer distances between the connection points increase the stress at the connection points and thus the risk of damage to the membrane. The shape and size of the connection point also is important with larger dots or longer lines reducing stress.

Significant factors in driving the choice of manufacturing methods include the flatness of the panel, material choices, and cost per panel. Flat panels can also be used where the channel height is only driven by the bulging of the material. Modelling and experimentation indicate a reduction in the number of dots to 50-500 depending on the expected flow rates, the modulus for the membrane, and the viscosity and pressure of the liquid desiccant.

Improving distribution of the membrane on the panel and between panels at very low flow rates require a positive pressure drop across the flow direction of the panel as well as adjusting this pressure depending on the viscosity of the liquid desiccant. Dynamic Viscosity in mPa·s results from the concentration and temperature of the liquid desiccant. Colder, higher concentrated desiccant is more viscous.

Flow in the panels has typically been pressure driven using overflow tubes on the top of the panel and air references at or below the bottom of the panel. For most of the relevant concentrations and temperatures the system will maintain a constant high pressure in the panel. Only at high temperatures or low concentrations will the pressure needed to maintain the flow drop. When the pressure across the panel becomes negative coverage will be reduced and latent effectiveness of the panel will drop.

Flow and pressure controls need to maintain low flows, positive pressure and high coverage over a wide range of temperatures and concentrations of liquid desiccant. They also need to allow for separate operation of conditioner and regenerator in both heating and cooling modes. The design should ensure that desiccant film flow rates do not exceed ⅕th of the airflow in lb./min. An overflow tube pressure regulator allows pressure at the beginning of a block of panels to be determined by the flow rate and viscosity, until the pressure drop is higher than the height of the tube. Then part of the liquid desiccant flow will be diverted back into the tank and the flow through the panel will drop while maintaining positive pressure in the complete channel. As a result at high viscosity and constant pressure, flows through the panel will be low, while still maintaining coverage while most of the desiccant pumped will overflow and return to the tank via the overflow tube.

Low flow rates reduce the effectiveness of the panel, since the delta concentration in the liquid desiccant increases. But system efficiency can still improve since the heat losses through the liquid desiccant heat exchanger go down as flows increase.

As the concentration of the liquid desiccant is lowered or temperatures increase, the flow will increase until the flow through the panel becomes equal to the flow presented.

Modelling has shown over what range of temperatures and concentrations of the liquid desiccant an effective channel height of 0.1 to 0.5 mm can maintain the necessary flow rate of 1.5 to 15 mm/sec. with an entry pressure between 0 and 10 inches of water pressure and with siphoning with a reference point between 0 and 4 inches below the panel in both horizontal and vertical flows. Concentration ranges depend on the type of application and are typically between 20-35%. An application with a lower target range of 15-25% at high temperatures would benefit from a narrower channel Applications that have a need for higher concentrations of 40-45% could benefit from a wider channel, especially if these concentrations are needed in a heating mode with lower temperatures then during a cooling cycle.

In liquid desiccant systems, the difference in concentration between the conditioner and regenerator is typically less than 2%. Depending on outside conditions and controls, liquid desiccant concentrations can vary from 10-45% without risks of crystallization or condensation in the panels. More typically concentrations between 20 and 35% are maintained to minimize tank size and volume of liquid desiccant required to fill the system. A narrower range reduces the size of the system and the cost of the liquid desiccant.

Temperatures between a conditioner and regenerator typically differ 30-60 F. As a result the viscosity of the liquid desiccant at the warmer unit will be lower than at the colder unit. To maintain the same flow at the warmer unit as at the colder unit will require a 50-75% lower pressure drop at the warmer unit, driven by the difference in temperature over a broad range of concentrations. When an overflow tube pressure regulator is used this results in a 50-75% lower riser tube. In cooling mode the regenerator is the warmer unit. In heating mode the conditioner is the warmer unit. Therefore the pressure control device of the regenerator will need to be adjusted when the system changes from cooling to heating or back. In heating mode the height of the riser tube can be 4 to 8* higher than the setting in cooling mode. This can be achieved for example by designing the regenerator riser for the high pressure and allowing for a low level escape valve to be opened in cooling mode.

A variety of plate and other structure designs are possible for membrane structures in accordance with one or more embodiments.

In one example, plates can have dimensions of about 500 by 500 mm. A variety of materials can be used for these plates, including plastics like Polypropylene, polycarbonates, polyethylene among others. Other metals can also be used, including titanium because of its anti-corrosive qualities but also metal piping covered with anti-corrosive material, e.g., tubes or plates covered with plastic. The latter allows the use of refrigerant as cooling fluid, thereby eliminating the need for a refrigerant-to-heat transfer fluid heat exchanger.

Smaller panels of 200-300 mm can reduce the size and weight of the heat exchangers as well as the pressure drop through the panel for a given airflow and enthalpy load. Air gaps below 2.5 mm have been demonstrated, eliminating the need for features inside the channel to stir the air. A narrow empty air gap reduces wear of the membrane and improves reliability but imposes additional requirements for panel flatness and a well-controlled height of the desiccant channel Bulging of the channel becomes more problematic as panels get narrower without standoffs in the channel.

Taller and shorter panels from 200 mm to 1000 mm are also possible providing different form factors which are particularly important in industrial applications.

A significant factor in creating a thin film is the depth of the liquid desiccant channel, which should be less than 0.5 mm. Channel heights of 0.1-0.25 mm have been found suitable Thinner channels reduce the flow rate of the desiccant which has been shown to increase overall system efficiency as long as uniform desiccant flow and membrane wetting out can be achieved.

The channel height is determined by the height of the raised features to which the membrane is attached (if any) and the bulging of the membrane between the features or attachment points.

Figure 10:
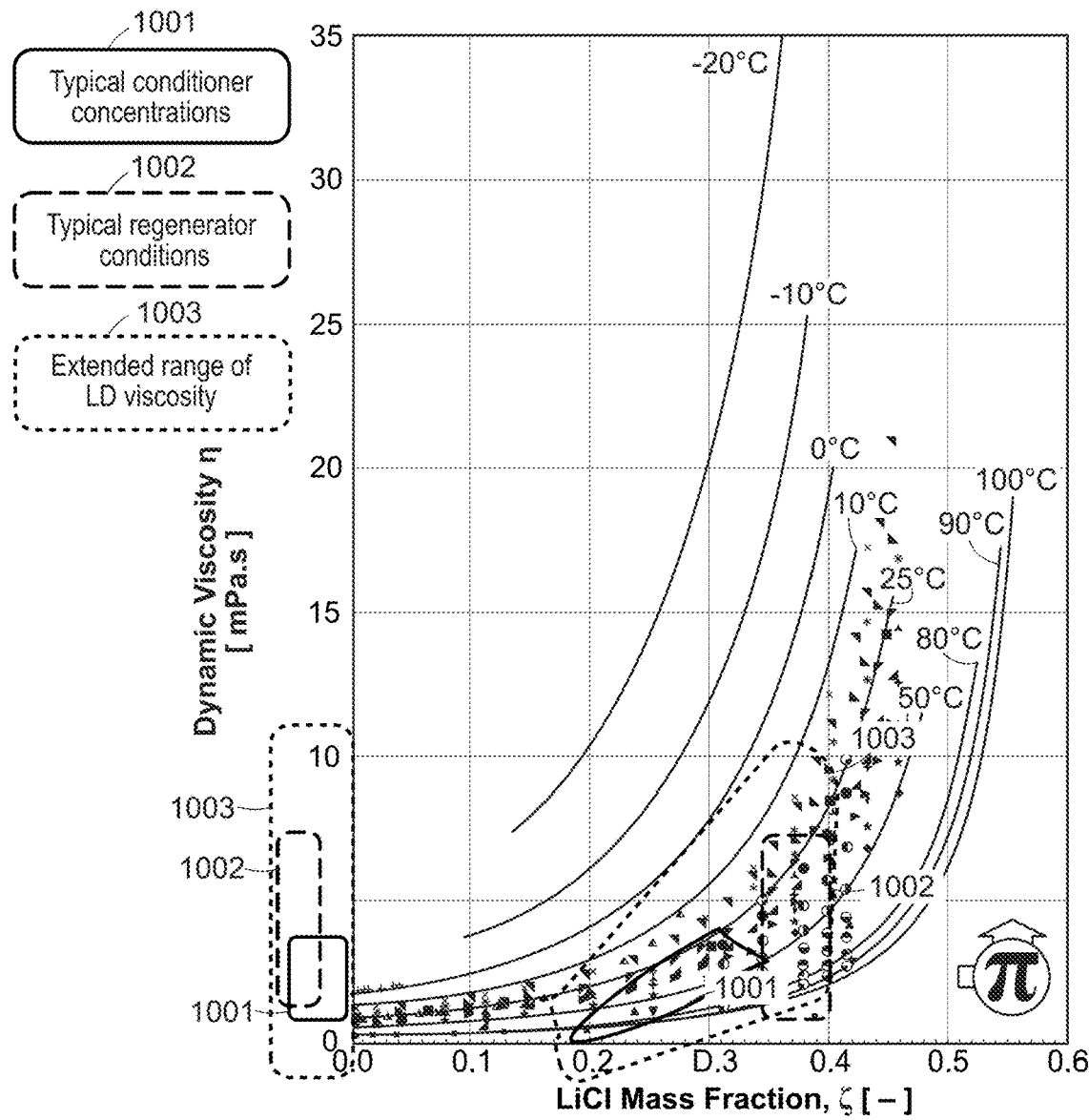
FIG. 10 is a graph showing the relationship between viscosity, temperature, and concentration for a typical liquid desiccant LiCl.

FIG. 10 shows the experimental relationship between viscosity, concentration, and temperature of liquid desiccant as well as some theoretical approximations 1001 shows a typical set of conditioner concentrations. Extremely high concentrations, e.g., in hot and dry conditions are shown in 1002, and the full range of potential viscosities in a system in heat pump mode is shown in 1003.

Figure 11A:
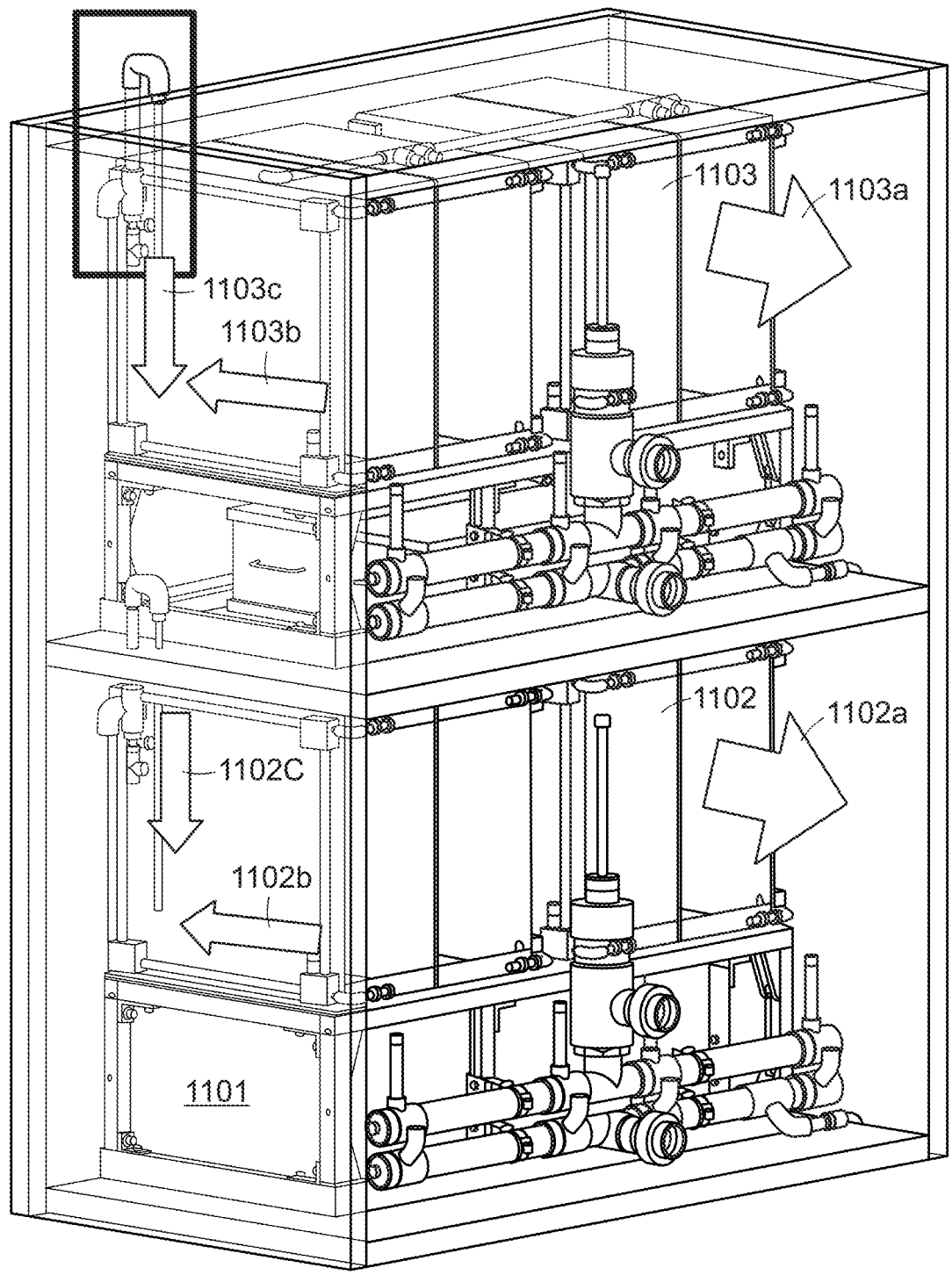
FIG. 11A illustrates a liquid desiccant air conditioning unit in accordance with one or more embodiments showing the flow of liquid desiccant through the unit.

FIG. 11A illustrates an exemplary liquid desiccant flow system in accordance with one or more embodiments. Desiccant is pumped from tank 1101 to conditioner blocks 1102 and regenerator blocks 1103. Here the regenerator blocks are shown in embodiment above the conditioner. Other embodiments with the units in parallel or with the conditioner above the regenerator are also used. They depend mostly on the required form factor for the unit. The panels in this embodiment are shown here in a vertical orientation with horizontal airflow 1102*a* for the air supply and 1103*a* for the regenerator airflow, counter flow for the heat transfer fluid (1102*b*/1103*b*) and vertical cross flow for the liquid desiccant (1102*c*/1103*c*). Vertical air- and heat transfer fluids as well as horizontal liquid desiccant flows have also been disclosed and provide flexibility in form factors and airflow design.

Figure 11B:
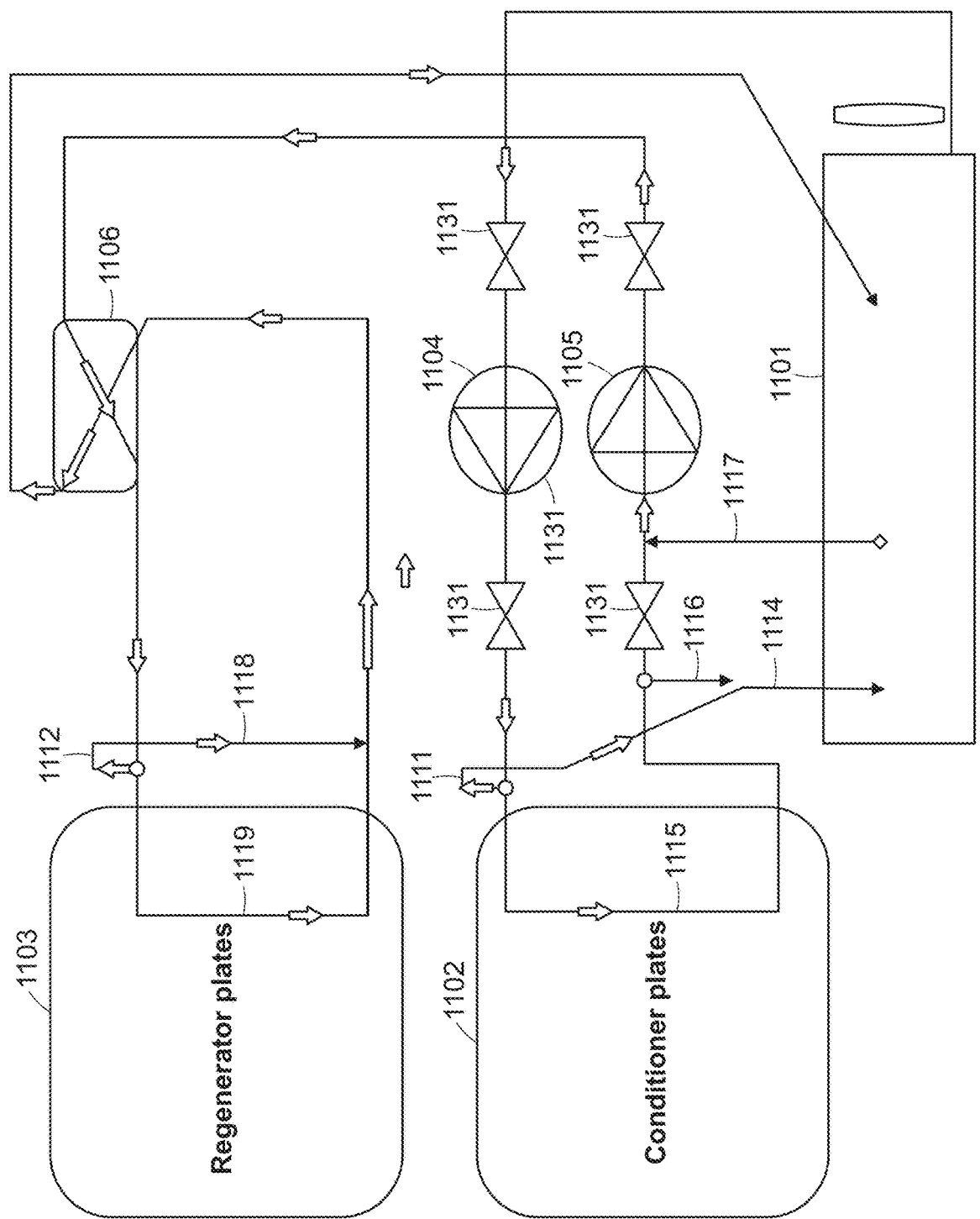
FIG. 11B shows the same flow path for a single tank system schematically, including pumps in the unit.

FIG. 11B shows the flow of the liquid desiccant through the conditioner block 1102 and the regenerator block 1103 from the desiccant tank 1101. Desiccant is pumped with 1104 to pressure/flow regulator 1111 through the block. Pump 1105 sends the Liquid desiccant to liquid desiccant heat exchanger 1106. The diluted liquid desiccant is then send through block 1103 via pressure/flow regulator 1112 the height of the riser 1111 and 1112 is linked to the operating conditions especially of the liquid desiccant. Higher risers are needed for colder and more concentrated liquid desiccant.

The liquid desiccant that passes through the block 1115 can be diverted via 1116 to the tank. This allows the conditioner to be operated independently from the regenerator. Similarly, 1117 is a one way valve that allows extra desiccant to be added to the regenerator if the flow from the conditioner is low or the regenerator is operated independently. Valves 1131 are isolation valves for maintenance of the pumps and have no role in the direct regulation of the flows. The overflow from 1111 is directed via 1114 to the tank. The overflow from the regenerator pressure/flow controller 1112 is directed via 1118 back to the flow 1119 from the regenerator and returns via the heat exchanger to the tank.

The choice to place the heat exchanger between the tank and the regenerator is appropriate for systems that supply temperatures well below ambient and regenerate at low temperatures. Deep dehumidification at high concentrations and high regeneration temperatures may make a heat exchanger between the tank and the conditioner more attractive.

FIG. 11C shows how the desiccant is supplied to the blocks at the top as shown in 1112 for the regenerator. The pressure flow regulator 1111 allows desiccant to enter the blocks at 1115. The height of the desiccant in 1110 reflects the pressure required to maintain a constant desiccant flow. If the required pressure to maintain the constant flow exceeds the height of the riser tube at 1110*b* the excess liquid desiccant is returned to the tank in 1114.

Figure 12:
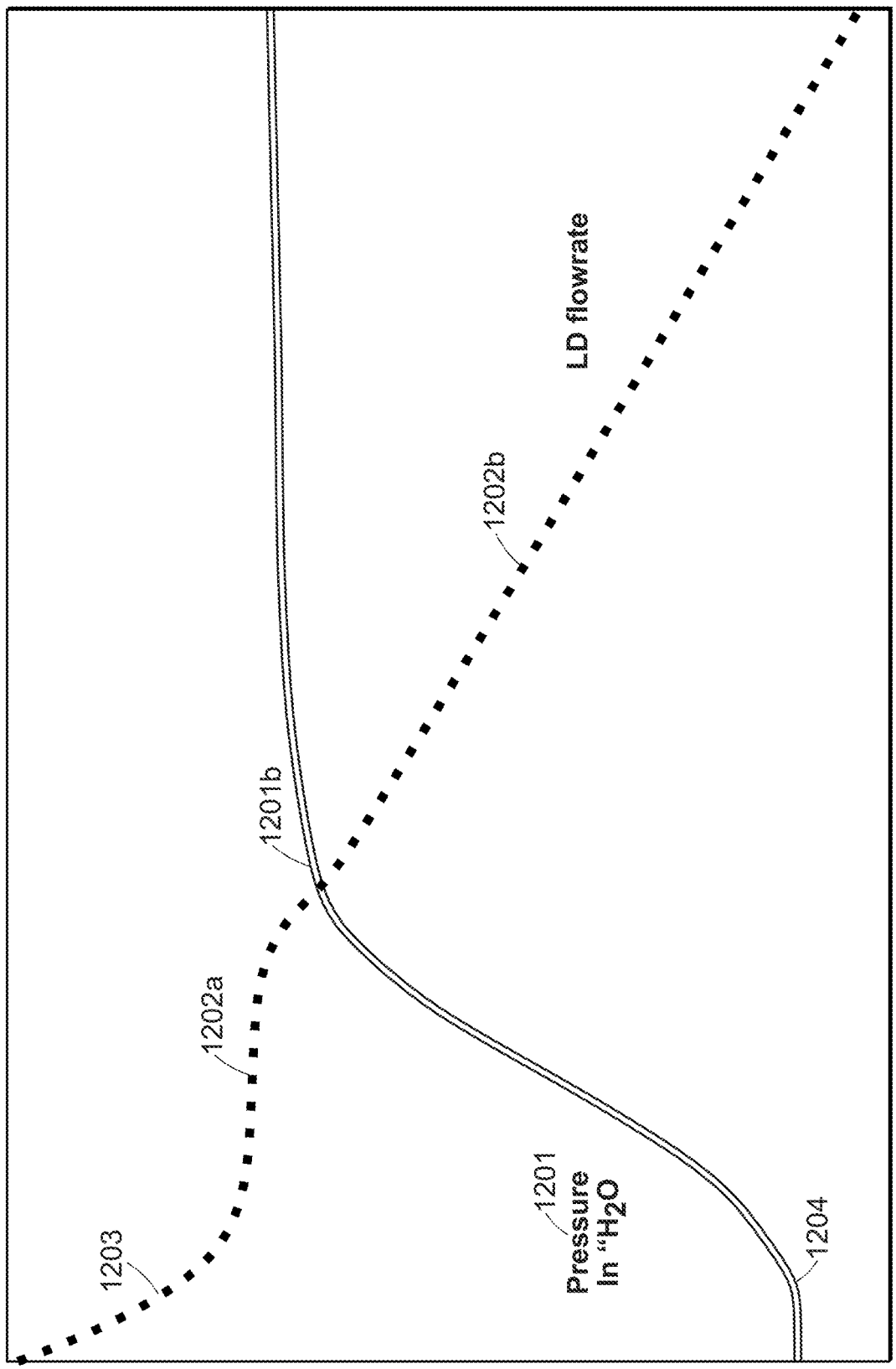
FIG. 12 shows the relationship between the liquid desiccant flow rate in l/min and the pressure in inches H20.

The resulting pressure flow characteristic for the liquid desiccant is shown in FIG. 12. At low liquid desiccant viscosities, i.e., at low concentrations and/or high temperatures, the flow is constant as the pressure 1201 at the beginning of the panel increases. As concentrations rise and/or temperatures are reduced the viscosity of the liquid desiccant increases. When the pressure required to maintain a constant flow 1202*a* exceeds the height of the riser tube 1201*b*, the flow through the panel will start to be reduced 1202*b*.

At very low viscosities it may be necessary to increase flows 1203 to maintain a positive pressure drop 1204 across the panel.

Figure 13:
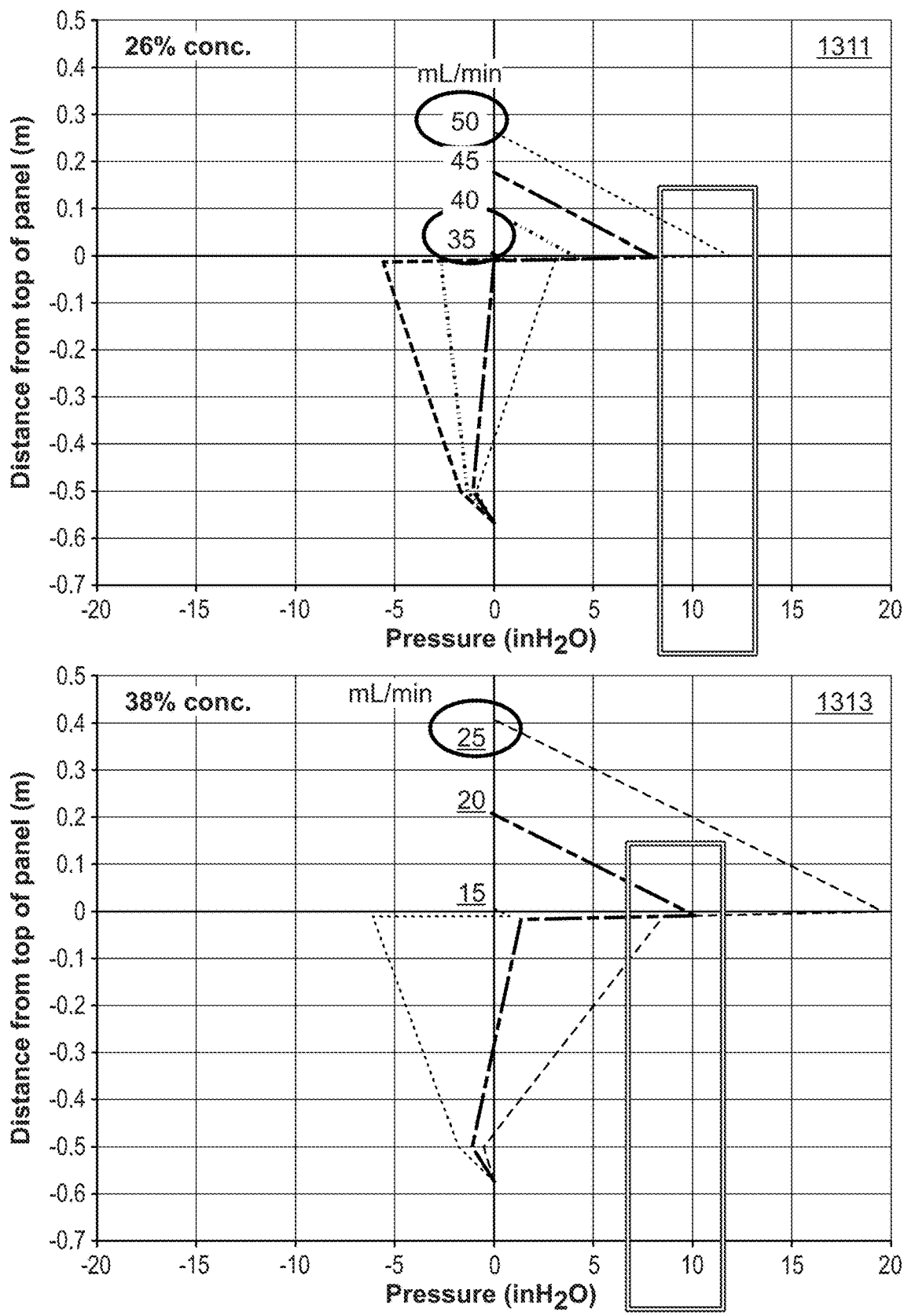
FIG. 13 shows typical pressure/flow rate patterns for the panels in FIG. 11.

FIG. 13 shows the resulting flow rates and pressure drop in the panels based on a simulation of an actual panel design. The pressure at the beginning of the panel is shown at 1301 in cm or inches of water. The pressure at the top of the panel is shown at 1302, which reflects the resistance in the manifold. 1303 shows the resulting pressure at the top of the desiccant film behind the membrane. At the bottom of the membrane the pressure drop is negative when syphoning 1305 is used or zero with an air reference at the same height as the bottom of the panel. Good coverage and distribution is achieved with a gradual drop in pressure through the panel. If the panel does not have a positive pressure through the desiccant channel, then it is not fully filled and coverage and distribution will suffer 1306. FIG. 13 shows that a minimum flow rate of 60 ml/min is required for good coverage at 20% LiCl and 25 C with a 10 inch pressure drop, while at 1313 with a liquid desiccant concentration of 38% a flow of only 20 ml/min will maintain the same pressure drop and thus good coverage.

Again the challenge is how to maintain uniform distribution and coverage of the membrane over a full range of temperatures and concentrations.

FIG. 14A is a simplified cross-section view showing formation of an exemplary uniform liquid desiccant channel in accordance with one or more embodiments using a combination of embossed or thermoformed raised features 1401 on a plate structure and the flexibility/billowing of the membrane 1402. Typically, a thermoformed height 1403 of about 0.1 to 0.3 mm is used to maintain a total height 1404 between 0.2 and 0.5 mm. The width of the channel is modelled at 300 mm in this exemplary embodiment. Distances 1405 between heat-sealed dots 1406 vary between 1 and 3 cm for high dots and 2 and 6 cm for flat panels. This allows for desiccant flow rates of between 4 and 12 mm/sec with a pressure drop of 3 to 6 inches over the panel for liquid desiccant with concentrations between 20 and 35%.

FIG. 14B shows how the same effective height dimension can be achieved without raised thermoformed features, but with a pattern of heat sealing features, where the heat seals can be dots, ovals or lines shaped to minimize sheer of the membrane 1402.

Figure 14C:
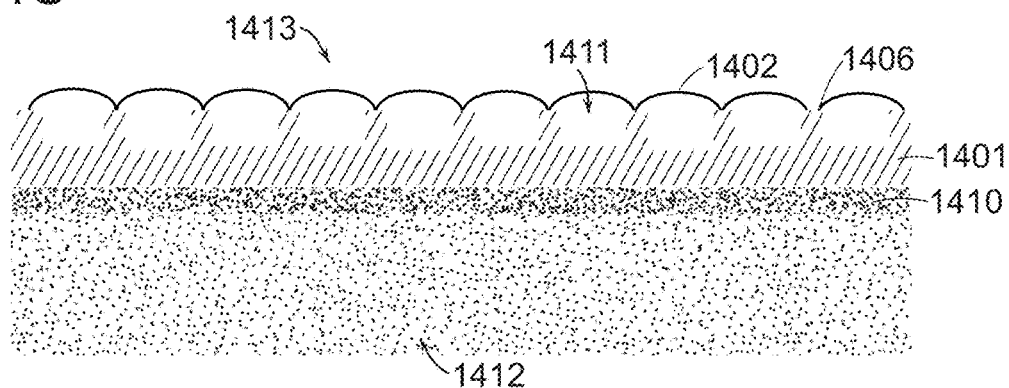
Figure 14D:
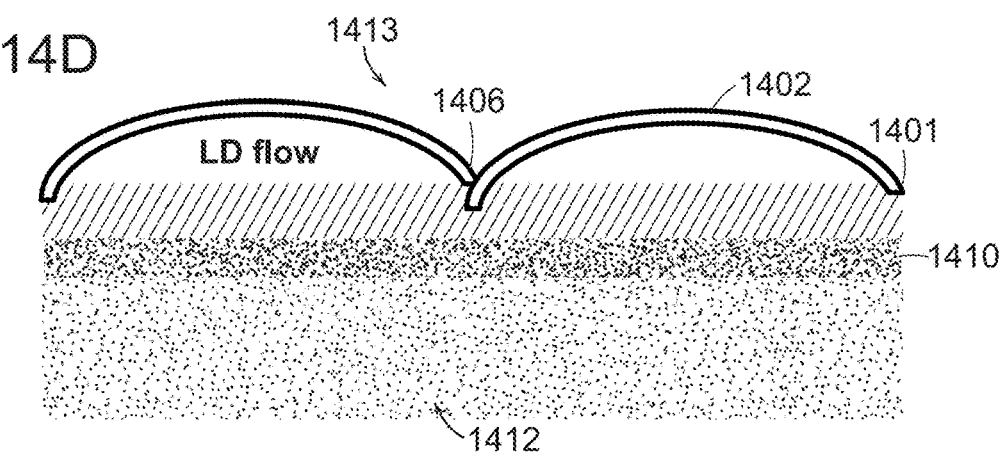

FIGS. 14C and 14D shows how the channel height restriction in flat structures has outside air 1413 on the outside and heat transfer fluid 1412 inside the panel 1411. Liquid desiccant flows between the panel and the membrane. The sheet 1401 can be made up out of multiple layers, e.g. a very thin polymer layer 1401 to prevent corrosion and high strength metal layer 1410. In the latter case, the heat transfer fluid can be refrigerant assuming the channel formed by the sheets 1410 are designed to withstand the high pressure of refrigerants.

Figure 14E:
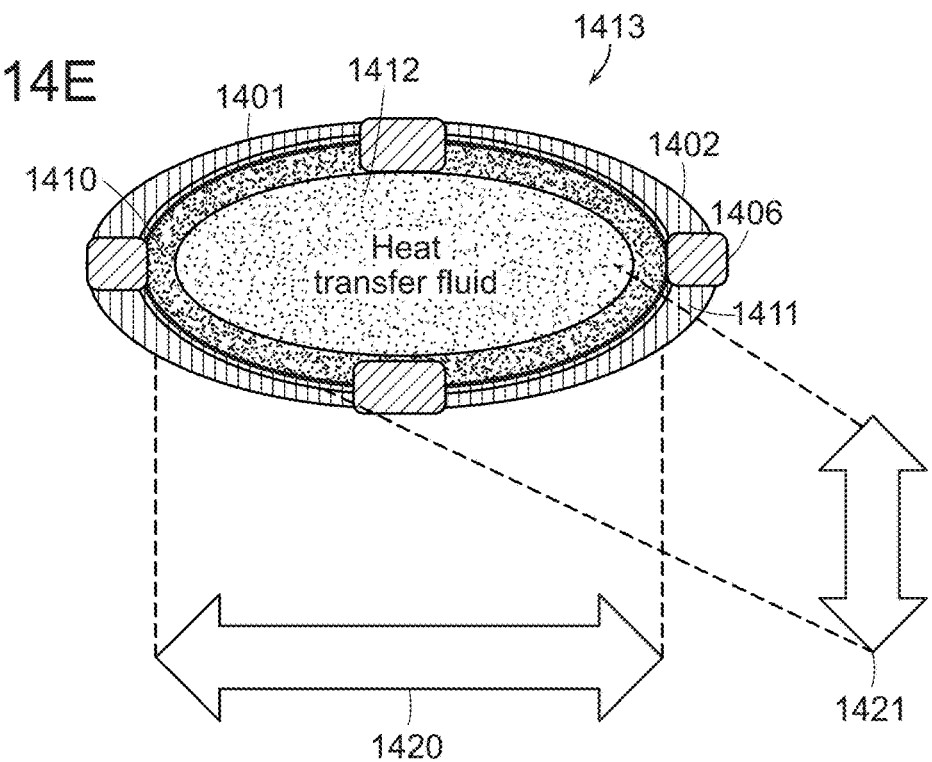

FIG. 14E shows a tubular channel in cross section where a sheet 1401 is bent to form a tube with heat transfer fluid and the membrane 1402 is sealed at intervals 1406 to the sheet surrounding the heat transfer fluid 1412. The air 1413 flows over the membrane 1402 and is dehumidified by the liquid desiccant 1411. The ratio of the tubes dimensions 1420 and 1421 can vary from 1:1 to 1:10 depending on the needs of the heat exchanger.

The shape of the panel is driven by cost, strength, form factors and system requirements. However, the combination of a thin channel geometry created through a pattern of features that heat seals the membrane to the sheet surrounding the heat transfer channel with the pressure control mechanisms described below can ensure uniform distribution of the desiccant and wet out of the membrane.

Figure 14F:
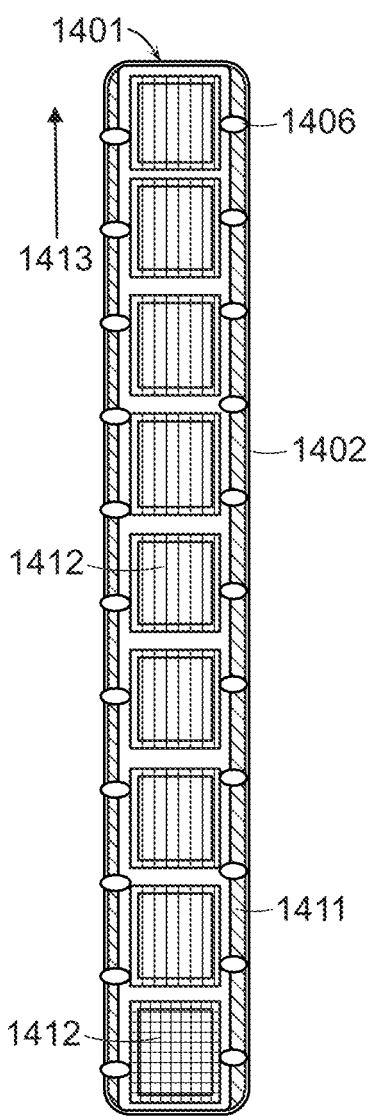

Examples of various alternative panel structures in accordance with one or more embodiments are shown in FIGS. 14F through 14K. FIG. 14F is a cross section of extruded polymer tubes with the membrane heat sealed to it. One or more of the extruded channels can be used as a manifold for the liquid desiccant. The channels can be horizontal or vertical to ensure counterflow of the heat transfer fluid with the airflow 1403.

Figure 14G:
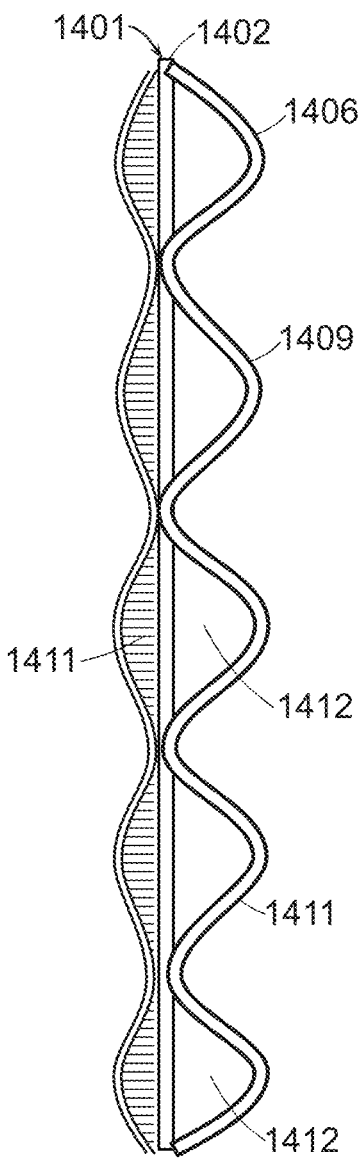

A different alternative design is shown in FIG. 14G where very thin polymer sheet 1401 is sealed to a similar flexible sheet 1409 that has been vacuum formed into channels for the heat transfer fluid 1412 and to the membrane 1402 that creates the channel for the liquid desiccant 1411. Such a flexible structure may involve an external frame to create consistent air channels between the membranes, but could be a cost effective and efficient solution if the polymer sheet 1401 is sufficiently thin.

Figure 14H:
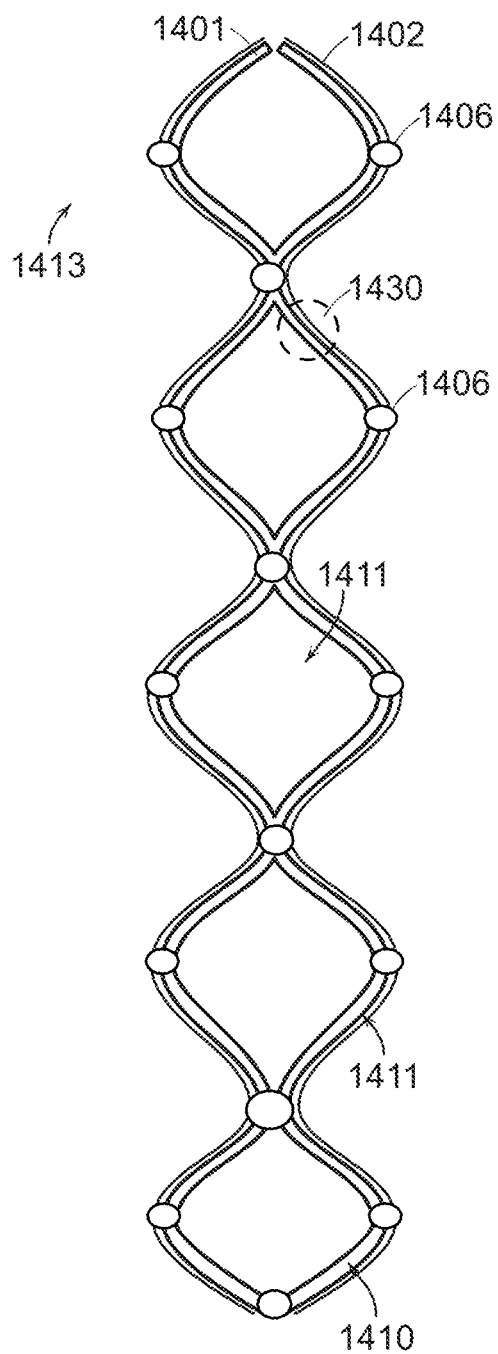

FIG. 14H shows a membrane covered sheet 1401 that is heat-sealed to membrane 1402 through again a pattern of heat-seals 1406 optimized for channel height and membrane shear. The sheets can be shaped to form a channel for the heat transfer fluid 1412.

Figure 14I:
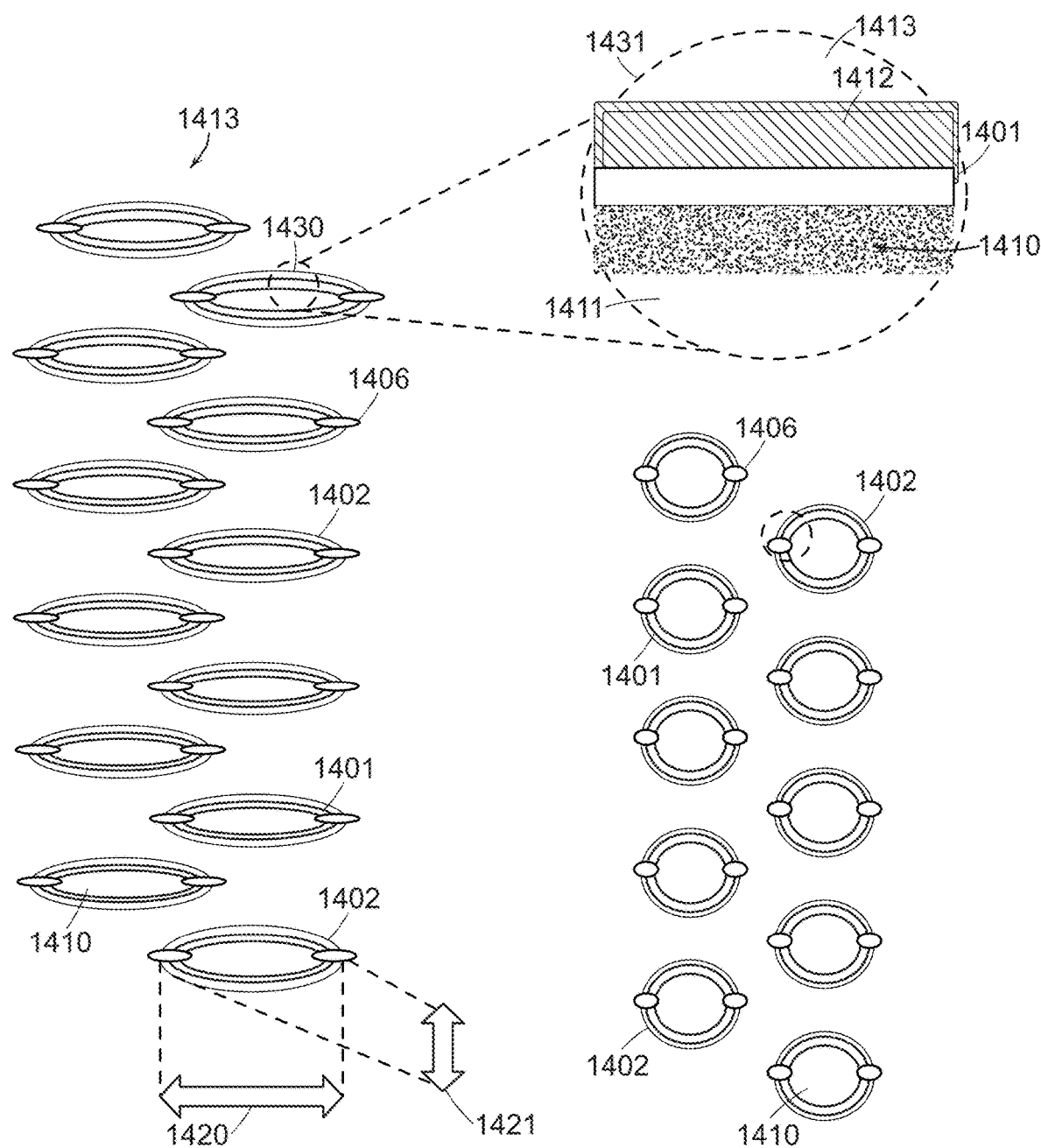

FIG. 14I shows how the tubular channels of FIG. 14E can be used to create a heat exchanger where the ratio of the tubes width and height can vary. 1430 shows in a cross section how the sheet material can again be either a polymer or a polymer covered metal.

Figure 14J:
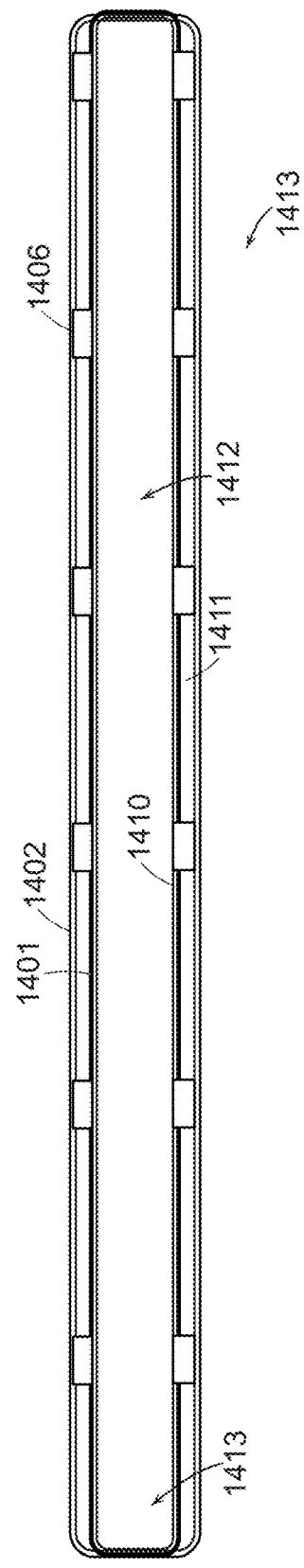
Figure 14K:
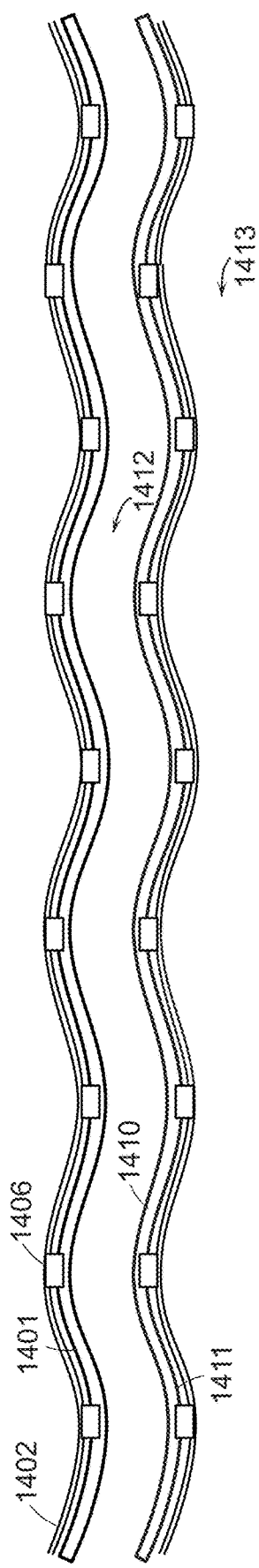

FIGS. 14J and 14K show panels in a horizontal position where the panel can be bent into a wavy structure for additional strength. The use of composite metal/polymer sheets can add strength and improve heat transfer. If the composite channel is used with a refrigerant, it can eliminate the need for a refrigerant-to-heat transfer fluid heat exchanger, thus improving system efficiency.

In one or more embodiments, a constant speed liquid desiccant pump is used with a flow regulator to send liquid desiccant through the membrane modules. Alternatively, a variable speed pump is used to move liquid desiccant through the membrane modules.

Non-Limiting Examples:
Various exemplary liquid desiccant air conditioning system embodiments may include the following operational features:
1. Flow rate of desiccant in 1 between 0.01 and 0.1 l/min per panel for a 20-50 cm and 50 cm wide panel with an design airflow between 10 and 20 cfm
2. Flow rates increase with total airflow and total work
3. Total airflow is proportional to panel height
4. At these flow rates, the height of the channel of 1 is determined by height of the connection point, modulus of the membrane, and the distance between the membrane connection points
5. For 20 micron membranes without backing the distance between features is 2 to 5 cm for a flat panel and 0.5 to 1 cm for connections points of 0.1 to 0.15 mm. The relevant distance (largest distance) between the connection points increases as the height of the connection points gets lower.
6. Total surface area of the connection points do not exceed 15% of the panel.
7. The height of the connection features can be created by thermoforming or embossing extruded sheets or by injection molding
8. The features can be dots or lines.
9. Cooling of the desiccant can be heat transfer fluid or refrigerant.
10. When cooling is by refrigerant through welded metal structures, usually made copper, that can withstand high pressure transfer heat to/from the corrosion resistant sheet connected to the membrane. The height of and distance between the connection points can be set by the metal structure before coating with a corrosion resistant sheet to which the membrane is bonded, e.g. a thin PE layer.
11. A flat coated metal sheet has 2 to 5 cm distance between the connection points
12. The connection points can be dots or lines.
13. The channel height can be increased by using hydrophilic materials, wicking layers or coatings on the sheet or in the channel for a higher cost panel with greater control over desiccant flows
14. Air references above and below the panel can be used to set the pressure on the desiccant entering and exiting the panel, which will be equal to the distance between the highest and lowest reference point. The pressure gradient in the panel should be positive, i.e. higher pressure higher in the panel.
15. Height of channels in flat panels is up to 100% higher than in vertical panels.
16. Flow in the panel is pressure driven allowing flow rates to vary with temperature and concentration. Fixed flow rates lead to excessive pressures on the connection points at high concentrations and low temperatures and to gravity driven flow with low coverage at low concentrations and high temperatures.
17. Pressures over regenerator panels side is 2-4 times pressure over the conditioner in cooling mode and the reverse in heating mode.
18. Height of the pressure reference points is changed as the system switches from cooling to heating mode.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

The invention claimed is:

1. A heat exchanger for use in a desiccant air conditioning system, comprising:
   a plurality of membrane-covered structures facing each other in a generally parallel arrangement and being spaced apart to define air channels therebetween through which an air flow to be treated by the desiccant air conditioning system can flow, each of said membrane-covered structures comprising:
   a structure having a hollow interior portion defining a heat transfer fluid channel through which a heat transfer fluid can flow, said structure also having one or more outer hydrophobic polymer surfaces; and
   one or more hydrophobic polymer membranes covering the one or more outer surfaces of the structure to define a liquid desiccant gap therebetween through which a liquid desiccant can flow, each membrane being heat sealed to the outer surface of the structure at discrete locations spaced apart by less than 50 mm on the outer surface to define liquid desiccant flow channels, wherein the liquid desiccant flow channels have a channel height measured from the outer surface to the membrane not exceeding 0.5 mm; and
   a liquid desiccant pressure regulator connected to a liquid desiccant inlet of the heat exchanger, said pressure regulator configured to maintain a positive pressure at the liquid desiccant flow channels not exceeding a given preset value at a flow rate sufficient to fill each of the liquid desiccant flow channels across a given range of liquid desiccant temperature and concentration conditions, said liquid desiccant pressure regulator configured to divert a portion of the liquid desiccant flowing to the heat exchanger to a liquid desiccant tank in order to maintain a constant liquid desiccant pressure at the liquid desiccant flow channels.

2. The heat exchanger of claim 1, wherein each membrane is heat sealed to the outer surface of the structure at discrete locations spaced apart by less than 30 mm on the outer surface to define liquid desiccant flow channels.

3. The heat exchanger of claim 1, wherein the liquid desiccant flow channels have a channel height measured from the outer surface to the membrane not exceeding 0.3 mm.

4. The heat exchanger of claim 1, wherein the flow rate in the liquid desiccant flow channels can be further maintained by a constant flow device between a pump and the liquid desiccant pressure regulator.

5. The heat exchanger of claim 1, wherein the pressure regulator comprises an overflow tube or a spring-activated back pressure regulator.

6. The heat exchanger of claim of 1, wherein the pressure regulator is configured to limit the flow rate of the liquid desiccant flowing into the liquid desiccant flow channels to 2-10 mm/sec while maintaining a positive pressure at the inlet of each liquid desiccant flow channel across a range of temperatures and liquid desiccant concentration levels to improve uniformity of the wetting out of the membranes and the uniformity of the liquid desiccant flowing through the liquid desiccant flow channels.

7. The heat exchanger of claim 1, wherein the pressure regulator is configured to maintain the flow rate of the liquid desiccant at $1/5$-$1/20$th of the flow rate of the air in lbs./min. over a temperature range 50-140° F. during cooling operations and 0-100° F. during heating operations for desiccant concentrations ranging from about 15-40% when the liquid desiccant comprises LiCl.

8. The heat exchanger of claim 1, wherein the pressure regulator is configured to maintain the flow rate of the liquid desiccant at less than $1/5$th of the flow rate of the air flow in lbs./min. over a range of liquid desiccant temperature and concentration levels needed to condition the air by humidification, dehumidification, cooling, or heating.

9. The heat exchanger of claim 1, wherein the discrete locations at which the membrane is heat sealed to the outer surface of each structure comprise a pattern of lines or dots.

10. The heat exchanger of claim 1, wherein the outer surface of each structure includes a plurality of raised features at the discrete locations at which the membrane is heat sealed.

11. The heat exchanger of claim 10, wherein the raised features comprises less than 15% of the surface area of the outer surface of each structure.

12. The heat exchanger of claim 1, wherein the heat transfer fluid gap in each structure has a thickness of 0.5 mm to 2 mm.

13. The heat exchanger of claim 1, wherein each structure comprises a panel, and wherein the panels have a vertical orientation.

14. The heat exchanger of claim 1, wherein each structure comprises a panel, and wherein the panels have a horizontal orientation.

15. The heat exchanger of claim 1, wherein the hollow interior portion of each structure is defined by a metal layer, and wherein the heat transfer fluid comprises a refrigerant.

16. The heat exchanger of claim 1, wherein each structure has a tubular shape.

17. The heat exchanger of claim 1, wherein each structure has a planar construction.

18. The heat exchanger of claim 1, wherein each structure comprises two polymer plates that are sealed together around their periphery.

19. The heat exchanger of claim 1, wherein each structure has a curved plate shape.

20. The heat exchanger of claim 1, wherein each structure is vacuum formed to form the heat transfer fluid gap.

21. The heat exchanger of claim of 1, wherein the pressure regulator is configured to limit the flow rate of the liquid desiccant flowing into the liquid desiccant flow channels to 5-10 mm/sec.

* * * * *